(12) United States Patent
Skelton

(10) Patent No.: US 9,079,494 B2
(45) Date of Patent: Jul. 14, 2015

(54) SYSTEMS, DEVICES AND METHODS FOR VEHICLES

(75) Inventor: Clay Skelton, Roanoke, VA (US)

(73) Assignee: Mill Mountain Capital, LLC, Roanoke, VA (US)

( * ) Notice: Subject to any disclaimer, the term of this patent is extended or adjusted under 35 U.S.C. 154(b) by 528 days.

(21) Appl. No.: 13/151,966

(22) Filed: Jun. 2, 2011

(65) Prior Publication Data

US 2012/0253552 A1 Oct. 4, 2012

Related U.S. Application Data

(60) Provisional application No. 61/360,623, filed on Jul. 1, 2010.

(51) Int. Cl.
  *G05D 1/00* (2006.01)
  *B60K 28/06* (2006.01)
  *H04W 48/04* (2009.01)
  *B60R 25/00* (2013.01)

(52) U.S. Cl.
  CPC .............. *B60K 28/063* (2013.01); *B60R 25/00* (2013.01); *B60W 2540/22* (2013.01); *H04W 48/04* (2013.01)

(58) Field of Classification Search
  CPC .. H04W 48/04; H04K 3/415; H04K 2203/22; B60K 28/063; B60W 2540/22; B60R 25/00
  USPC ........... 455/575.9; 307/10.3; 340/426.13, 5.2; 701/1, 2, 51, 36, 29.1, 29.6
  See application file for complete search history.

(56) References Cited

U.S. PATENT DOCUMENTS

| | | | |
|---|---|---|---|
| 3,582,043 A | 6/1971 | Jacques | |
| 4,794,703 A | 1/1989 | Siband | |
| 7,095,336 B2 | 2/1991 | Weil | |
| 5,052,737 A | 10/1991 | Farmer | |
| 5,392,223 A | 2/1995 | Caci | |
| 5,591,902 A | 1/1997 | Castagner | |
| 5,645,388 A | 7/1997 | Lacasse | |
| 5,838,227 A * | 11/1998 | Murray | 340/539.21 |
| 5,948,040 A | 9/1999 | DeLorme | |
| 5,963,136 A | 10/1999 | O'Brien | |
| 6,107,691 A | 8/2000 | Gore | |
| 6,150,942 A | 11/2000 | Obrieng | |
| 6,198,996 B1 | 3/2001 | Berstis | |
| 6,321,158 B1 | 11/2001 | DeLome | |
| 6,338,013 B1 | 1/2002 | Ruffner | |
| 6,445,287 B1 | 9/2002 | Schofield | |

(Continued)

FOREIGN PATENT DOCUMENTS

WO 2011111076 9/2011

OTHER PUBLICATIONS

IPRP and ISR for PCT/US12/68993.

(Continued)

*Primary Examiner* — Gertrude Arthur Jeanglaud
(74) *Attorney, Agent, or Firm* — Rhodes IP PLC; Christopher R Rhodes

(57) ABSTRACT

Certain embodiments described herein are directed to devices, systems and methods for use in vehicle operations. In some examples, the devices, systems and methods described herein can be used to permit safe operation of a vehicle where the vehicle operator may have one or more mobile devices in their possession.

20 Claims, 10 Drawing Sheets

(56) References Cited

U.S. PATENT DOCUMENTS

| | | | |
|---|---|---|---|
| 6,450,587 B1 | 9/2002 | MacGregor | |
| 6,502,017 B2 | 12/2002 | Ruffner | |
| 6,526,352 B1 | 2/2003 | Breed | |
| 6,552,647 B1 | 4/2003 | Thiessen | |
| 6,600,981 B2 | 7/2003 | Ruffner | |
| 6,611,738 B2 | 8/2003 | Ruffner | |
| 6,647,328 B2 | 11/2003 | Walker | |
| 6,648,477 B2 | 11/2003 | Hutzel | |
| 6,650,975 B2 | 11/2003 | Ruffner | |
| 6,685,281 B2 | 2/2004 | MacGregor | |
| 6,687,339 B2 | 2/2004 | Martin | |
| 6,690,268 B2 | 2/2004 | Schofield | |
| 6,720,920 B2 | 4/2004 | Breed | |
| 6,768,944 B2 | 7/2004 | Breed | |
| 6,804,626 B2 | 10/2004 | Manegold | |
| 6,944,430 B2 | 9/2005 | Berstis | |
| 6,965,816 B2 | 11/2005 | Walker | |
| 6,965,916 B1 | 11/2005 | Kling | |
| 6,974,928 B2 | 12/2005 | Bloom | |
| 6,975,215 B2 | 12/2005 | Schofield | |
| 7,031,945 B1 | 4/2006 | Donner | |
| 7,053,761 B2 | 5/2006 | Schofield | |
| 7,054,965 B2 | 5/2006 | Bell | |
| 7,059,769 B1 | 6/2006 | Potega | |
| 7,073,129 B1 | 7/2006 | Robarts | |
| 7,085,637 B2 | 8/2006 | Breed | |
| 7,089,099 B2 | 8/2006 | Shostak | |
| 7,103,460 B1 | 9/2006 | Breed | |
| 7,126,951 B2 | 10/2006 | Belcea | |
| 7,131,136 B2 | 10/2006 | Monroe | |
| 7,133,768 B2 | 11/2006 | Mukaiyama | |
| 7,162,454 B1 | 1/2007 | Donner | |
| 7,167,703 B2 | 1/2007 | Graham | |
| 7,174,153 B2 | 2/2007 | Ehlers | |
| 7,174,154 B2 | 2/2007 | Ehlers | |
| 7,181,345 B2 | 2/2007 | Rosenfeld | |
| 7,203,665 B2 | 4/2007 | Donner | |
| 7,216,109 B1 | 5/2007 | Donner | |
| 7,259,357 B2 | 8/2007 | Walker | |
| 7,277,007 B2 * | 10/2007 | John et al. | 340/5.61 |
| 7,280,975 B1 | 10/2007 | Donner | |
| 7,312,712 B1 | 12/2007 | Worrall | |
| 7,313,467 B2 | 12/2007 | Breed | |
| 7,315,739 B2 | 1/2008 | Burch | |
| 7,343,350 B1 | 3/2008 | Donner | |
| 7,346,370 B2 | 3/2008 | Spaur | |
| 7,362,229 B2 | 4/2008 | Brinton | |
| 7,378,954 B2 | 5/2008 | Wendt | |
| 7,379,800 B2 | 5/2008 | Breed | |
| 7,379,891 B1 | 5/2008 | Donner | |
| 7,386,517 B1 | 6/2008 | Donner | |
| 7,395,507 B2 | 7/2008 | Robarts | |
| 7,408,453 B2 | 8/2008 | Breed | |
| 7,415,424 B1 | 8/2008 | Donner | |
| 7,444,210 B2 | 10/2008 | Breed | |
| 7,446,650 B2 | 11/2008 | Scholfield | |
| 7,460,007 B2 | 12/2008 | Schofield | |
| 7,466,244 B2 | 12/2008 | Kimchi | |
| 7,467,034 B2 | 12/2008 | Breed | |
| 7,477,135 B2 | 1/2009 | Belcher | |
| 7,487,114 B2 | 2/2009 | Florance | |
| 7,496,431 B2 * | 2/2009 | Ehrmaier | 701/1 |
| 7,512,450 B2 | 3/2009 | Ahmed | |
| 7,513,077 B2 | 4/2009 | Fridman | |
| 7,527,288 B2 | 5/2009 | Breed | |
| 7,529,713 B1 | 5/2009 | Donner | |
| 7,548,833 B2 | 6/2009 | Ahmed | |
| 7,549,327 B2 | 6/2009 | Breed | |
| 7,557,696 B2 | 7/2009 | Brinton | |
| 7,562,028 B1 | 7/2009 | Donner | |
| 7,562,051 B1 | 7/2009 | Donner | |
| 7,564,377 B2 | 7/2009 | Kimchi | |
| 7,565,328 B1 | 7/2009 | Donner | |
| 7,577,575 B1 | 8/2009 | Donner | |
| 7,577,619 B1 | 8/2009 | Donner | |
| 7,577,620 B1 | 8/2009 | Donner | |
| 7,579,393 B2 | 8/2009 | Malz | |
| 7,579,939 B2 | 8/2009 | Schofield | |
| 7,579,940 B2 | 8/2009 | Schofield | |
| 7,583,184 B2 | 9/2009 | Schofield | |
| 7,590,589 B2 | 9/2009 | Hoffberg | |
| 7,602,283 B2 | 10/2009 | John | |
| 7,603,894 B2 | 10/2009 | Breed | |
| 7,607,131 B2 | 10/2009 | Oe | |
| 7,616,965 B2 | 11/2009 | Rudravaram | |
| 7,617,159 B1 | 11/2009 | Donner | |
| 7,630,802 B2 | 12/2009 | Breed | |
| 7,650,210 B2 | 1/2010 | Breed | |
| 7,653,457 B2 | 1/2010 | Bloom | |
| 7,672,756 B2 | 3/2010 | Breed | |
| 7,689,249 B2 | 3/2010 | Silverbrook | |
| 7,689,510 B2 | 3/2010 | Lamkin | |
| 7,693,626 B2 | 4/2010 | Breed | |
| 7,706,965 B2 | 4/2010 | Downs | |
| 2001/0034220 A1 | 10/2001 | Berstis | |
| 2001/0056544 A1 | 12/2001 | Walker | |
| 2002/0003571 A1 | 1/2002 | Schofield | |
| 2002/0005999 A1 | 1/2002 | Hutzel | |
| 2002/0130065 A1 | 9/2002 | Bloom | |
| 2002/0156556 A1 | 10/2002 | Ruffner | |
| 2002/0178074 A1 | 11/2002 | Bloom | |
| 2003/0001734 A1 | 1/2003 | Schofield | |
| 2003/0093187 A1 | 5/2003 | Walker | |
| 2003/0223322 A1 | 12/2003 | Quinn | |
| 2004/0002354 A1 * | 1/2004 | Nagano | 455/550.1 |
| 2004/0008253 A1 | 1/2004 | Monroe | |
| 2004/0049324 A1 | 3/2004 | Walker | |
| 2004/0051379 A1 * | 3/2004 | Turner et al. | 307/10.2 |
| 2004/0124697 A1 | 7/2004 | MacGregor | |
| 2004/0142677 A1 | 7/2004 | Scholz | |
| 2004/0142704 A1 | 7/2004 | Scholz | |
| 2004/0145457 A1 | 7/2004 | Schofield | |
| 2004/0146047 A1 | 7/2004 | Turcan | |
| 2004/0153890 A1 | 8/2004 | Davis | |
| 2004/0227615 A1 * | 11/2004 | John et al. | 340/5.61 |
| 2004/0246926 A1 | 12/2004 | Belcea | |
| 2005/0040941 A1 | 2/2005 | Schofield | |
| 2005/0073438 A1 | 4/2005 | Rodgers | |
| 2005/0164673 A1 | 7/2005 | Ehlers | |
| 2005/0178677 A1 | 8/2005 | Morrow | |
| 2005/0187677 A1 | 8/2005 | Walker | |
| 2005/0192727 A1 | 9/2005 | Shostak | |
| 2005/0200204 A1 * | 9/2005 | Jonsson et al. | 307/10.3 |
| 2005/0216184 A1 | 9/2005 | Ehlers | |
| 2005/0245272 A1 | 11/2005 | Spaur | |
| 2005/0248444 A1 | 11/2005 | Joao | |
| 2005/0266879 A1 | 12/2005 | Spaur | |
| 2005/0266958 A1 * | 12/2005 | Ehrmaier | 477/73 |
| 2005/0275525 A1 | 12/2005 | Ahmed | |
| 2005/0278047 A1 | 12/2005 | Ahmed | |
| 2006/0020366 A1 | 1/2006 | Bloom | |
| 2006/0023681 A1 | 2/2006 | Rafat | |
| 2006/0025897 A1 | 2/2006 | Shostak | |
| 2006/0026017 A1 | 2/2006 | Walker | |
| 2006/0048800 A1 | 3/2006 | Rast | |
| 2006/0123053 A1 | 6/2006 | Scannell | |
| 2006/0125348 A1 | 7/2006 | Ohtaki | |
| 2006/0152348 A1 | 7/2006 | Ohtaki | |
| 2006/0154643 A1 | 7/2006 | Scholz | |
| 2006/0180371 A1 | 8/2006 | Breed | |
| 2006/0202815 A1 | 9/2006 | John | |
| 2006/0206246 A1 | 9/2006 | Walker | |
| 2006/0212193 A1 | 9/2006 | Breed | |
| 2006/0212194 A1 | 9/2006 | Breed | |
| 2006/0220817 A1 | 10/2006 | Schofield | |
| 2006/0232491 A1 * | 10/2006 | Nakamura | 343/841 |
| 2006/0243043 A1 | 11/2006 | Breed | |
| 2006/0244581 A1 | 11/2006 | Breed | |
| 2006/0277474 A1 | 12/2006 | Robarts | |
| 2006/0284839 A1 | 12/2006 | Breed | |
| 2006/0286930 A1 | 12/2006 | Rathus | |
| 2007/0005202 A1 | 1/2007 | Breed | |
| 2007/0057781 A1 | 3/2007 | Breed | |
| 2007/0067104 A1 | 3/2007 | Mays | |

(56) References Cited

U.S. PATENT DOCUMENTS

| | | |
|---|---|---|
| 2007/0075919 A1 | 4/2007 | Breed |
| 2007/0082614 A1 | 4/2007 | Von Mock |
| 2007/0087756 A1 | 4/2007 | Hoffberg |
| 2007/0096565 A1 | 5/2007 | Breed |
| 2007/0126561 A1 | 6/2007 | Ehlers |
| 2007/0129055 A1 | 6/2007 | Ehlers |
| 2007/0132567 A1 | 6/2007 | Schofield |
| 2007/0138347 A1 | 6/2007 | Ehlers |
| 2007/0139216 A1 | 6/2007 | Breed |
| 2007/0156320 A1 | 7/2007 | Breed |
| 2007/0171037 A1 | 7/2007 | Schofield |
| 2007/0205861 A1 | 9/2007 | Nair |
| 2007/0205881 A1 | 9/2007 | Breed |
| 2007/0211866 A1 | 9/2007 | Sink |
| 2007/0241261 A1 | 10/2007 | Wendt |
| 2007/0260487 A1 | 11/2007 | Bartfeld |
| 2007/0271014 A1 | 11/2007 | Breed |
| 2007/0280462 A1 | 12/2007 | Neece |
| 2007/0294594 A1 | 12/2007 | King |
| 2008/0014897 A1 | 1/2008 | Cook |
| 2008/0026770 A1 | 1/2008 | Rudravaram |
| 2008/0040005 A1 | 2/2008 | Breed |
| 2008/0046149 A1 | 2/2008 | Breed |
| 2008/0077882 A1 | 3/2008 | Kramer |
| 2008/0085689 A1 | 4/2008 | Zellner |
| 2008/0086240 A1 | 4/2008 | Breed |
| 2008/0091309 A1 | 4/2008 | Walker |
| 2008/0115410 A1 | 5/2008 | Fridman |
| 2008/0129475 A1 | 6/2008 | Breed |
| 2008/0140278 A1 | 6/2008 | Breed |
| 2008/0147265 A1 | 6/2008 | Breed |
| 2008/0147271 A1 | 6/2008 | Breed |
| 2008/0156406 A1 | 7/2008 | Breed |
| 2008/0161989 A1 | 7/2008 | Breed |
| 2008/0168099 A1 | 7/2008 | Skaf |
| 2008/0169939 A1 | 7/2008 | Dickens |
| 2008/0174484 A1 | 7/2008 | Katz |
| 2008/0174550 A1 | 7/2008 | Laurila |
| 2008/0212215 A1 | 9/2008 | Schofield |
| 2008/0216567 A1 | 9/2008 | Breed |
| 2008/0266079 A1 | 10/2008 | Lontka |
| 2008/0267416 A1 | 10/2008 | Goldstein |
| 2008/0284575 A1 | 11/2008 | Breed |
| 2009/0013052 A1 | 1/2009 | Robarts |
| 2009/0033150 A1* | 2/2009 | Ko et al. .................. 307/10.6 |
| 2009/0040042 A1 | 2/2009 | Lontka |
| 2009/0042533 A1 | 2/2009 | Lontka |
| 2009/0043441 A1 | 2/2009 | Breed |
| 2009/0079705 A1 | 3/2009 | Sizelove |
| 2009/0103925 A1 | 4/2009 | Alpert |
| 2009/0134606 A1 | 5/2009 | Schofield |
| 2009/0139781 A1 | 6/2009 | Straubel |
| 2009/0165049 A1 | 6/2009 | Sekiguchi |
| 2009/0165051 A1 | 6/2009 | Armady |
| 2009/0179501 A1 | 7/2009 | Randall |
| 2009/0263140 A1 | 10/2009 | Kagaya |
| 2009/0273479 A1 | 11/2009 | Waugh |
| 2009/0280771 A1 | 11/2009 | Bolin |
| 2009/0290369 A1 | 11/2009 | Schofield |
| 2009/0295572 A1 | 12/2009 | Grim |
| 2009/0299857 A1 | 12/2009 | Brubaker |
| 2010/0007485 A1 | 1/2010 | Kodrin |
| 2010/0078016 A1 | 4/2010 | Andrieux |
| 2010/0078017 A1 | 4/2010 | Andrieux |
| 2010/0078024 A1 | 4/2010 | Andrieux |
| 2010/0078026 A1 | 4/2010 | Andrieux |
| 2010/0087137 A1 | 4/2010 | Fischer |
| 2010/0090836 A1 | 4/2010 | Trummer |
| 2010/0104392 A1 | 4/2010 | Bowen |
| 2010/0152961 A1 | 6/2010 | Atri |
| 2010/0214083 A1* | 8/2010 | McNay .................. 340/426.1 |
| 2011/0065375 A1 | 3/2011 | Bradley |
| 2011/0070930 A1* | 3/2011 | Pothul et al. ............. 455/575.9 |
| 2011/0247445 A1* | 10/2011 | Vermeersch et al. ...... 74/473.21 |
| 2011/0275321 A1* | 11/2011 | Zhou et al. ................. 455/41.2 |
| 2011/0295458 A1 | 12/2011 | Halsey |
| 2012/0214408 A1 | 8/2012 | Chronister |
| 2012/0232765 A1* | 9/2012 | Holub et al. .................. 701/66 |
| 2012/0244883 A1* | 9/2012 | Tibbitts et al. ............ 455/456.2 |
| 2013/0151111 A1 | 6/2013 | Skelton |

OTHER PUBLICATIONS

IPRP and ISR for PCT/US12/68993, Dec. 11, 2012.

* cited by examiner

SYSTEMS, DEVICES AND METHODS FOR VEHICLES

PRIORITY APPLICATION

This application claim priority to, and the benefit of, U.S. Provisional Application No. 61/360,623 filed on Jul. 1, 2010, the entire disclosure of which is hereby incorporated herein by reference for all purposes.

TECHNOLOGICAL FIELD

This application is related to systems, devices and methods for vehicles. In particular, certain embodiments described herein are directed to safety devices, systems and methods for use with a vehicle.

BACKGROUND

Driver distraction has become an increasing problem as mobile device use has become more common. The ability of a driver to send text messages while driving leads to increased driver distraction, reduced reaction times and higher incidences of accident. While many states have passed laws forbidding use of cellular phones while driving, such use is often a secondary offense in most states or is not followed by most vehicle operators.

SUMMARY

In an aspect, a system for a vehicle comprising a processor and a circuit electrically coupled to the processor and configured to receive an input from a mobile device, the circuit constructed and arranged to prevent operation of the vehicle when the mobile device is not coupled to the circuit and to allow operation of the vehicle when the mobile device is coupled to circuit is provided.

In another aspect, a system for a vehicle comprising processing means and circuit means electrically coupled to the processing means and configured to receive an input from a mobile device, the circuit means constructed and arranged to prevent operation of the vehicle when the mobile device is not coupled to the circuit means and to allow operation of the vehicle when the mobile device is coupled to circuit means is disclosed.

In an additional aspect, a car key system comprising a processor and a circuit electrically coupled to the processor and configured to receive an input from a mobile device to prevent operation of a vehicle when the mobile device is not coupled to the circuit and to permit operation of the vehicle when the mobile device is coupled to the circuit, the processor configured to compare an identifier of the mobile device to an entry in a lookup table to permit operation of the vehicle if the identifier matches the entry in the lookup table is described.

In another aspect, a car key system comprising processing means and circuit means electrically coupled to the processing means and configured to receive an input from a mobile device to prevent operation of a vehicle when the mobile device is not coupled to the circuit means and to permit operation of the vehicle when the mobile device is coupled to the circuit means, the processing means configured to compare an identifier of the mobile device to an entry in a lookup table to permit operation of the vehicle if the identifier matches the entry in the lookup table is disclosed.

In an additional aspect, a coupler for electrically coupling a mobile device to a vehicle, the coupler comprising a circuit constructed and arranged to prevent operation of the vehicle when the mobile device is not coupled to the coupler and to permit operation of the vehicle when the mobile device is coupled to the coupler is provided.

In another aspect, a coupler for electrically coupling a mobile device to a vehicle, the coupler comprising circuit means constructed and arranged to prevent operation of the vehicle when the mobile device is not coupled to the coupler and to permit operation of the vehicle when the mobile device is coupled to the coupler is described.

In an additional aspect, a vehicle comprising an engine, a processor configured to control the engine, and a circuit electrically coupled to the processor and configured to receive an input from a mobile device, the circuit constructed and arranged to prevent operation of the vehicle when the mobile device is not coupled to the circuit and to allow operation of the vehicle when the mobile device is coupled to circuit is disclosed.

In another aspect, a vehicle comprising engine means, processing means configured to control the engine means, and circuit means electrically coupled to the processing means and configured to receive an input from a mobile device, the circuit means constructed and arranged to prevent operation of the vehicle when the mobile device is not coupled to the circuit means and to allow operation of the vehicle when the mobile device is coupled to circuit means is described.

In an additional aspect, a navigation system comprising a processor, a memory unit electrically coupled to the processor and comprising navigation information, a display electrically coupled to the processor, and a circuit electrically coupled to the processor and configured to receive an input from a mobile device, the circuit constructed and arranged to prevent operation of the vehicle when the mobile device is not coupled to the circuit and to allow operation of the vehicle when the mobile device is coupled to circuit is provided.

In another aspect, a navigation system comprising processing means, position detecting means electrically coupled to the processing means for determining a position of a vehicle, display means electrically coupled to the processing means for displaying route information, and circuit means electrically coupled to the processing means and configured to receive an input from a mobile device, the circuit means constructed and arranged to prevent operation of the vehicle when the mobile device is not coupled to the circuit means and to allow operation of the vehicle when the mobile device is coupled to circuit means is described.

In an additional aspect, a mobile device capable of text messaging, the mobile device configured to be coupled to a vehicle to permit starting of the vehicle when the mobile device is electrically coupled at least one electrical system of the vehicle, the mobile device further configured to disable the text messaging when the device is coupled to the vehicle is disclosed.

In another aspect, a mobile device capable of text messaging, the mobile device configured to be coupled to a vehicle to permit switching of the vehicle into drive when the mobile device is electrically coupled at least one electrical system of the vehicle, the mobile device further configured to disable the text messaging when the device is coupled to the vehicle is provided.

In an additional aspect, a method of preventing a vehicle operator from sending text messages while operating the vehicle, the method comprising coupling a mobile device to the vehicle to permit operation of the vehicle, and disabling text messaging of the mobile device to prevent sending of text messages while the mobile device is coupled to the vehicle is described.

In another aspect, a method of preventing a vehicle operator from sending text messages while operating the vehicle, the method comprising coupling a mobile device to the vehicle to permit operation of the vehicle, in which the mobile device is coupled to the vehicle at a position inaccessible to an operator of the vehicle is disclosed.

In an additional aspect, a method of permitting hands free phone calls from a mobile device while operating a vehicle and preventing text messaging from the mobile device while operating the vehicle, the method comprising coupling the mobile device to vehicle to permit operation of the vehicle and disabling the text messaging of the mobile device when coupled to the vehicle is provided.

In another aspect, a method of permitting hands free phone calls from a mobile device while operating a vehicle and preventing text messaging from the mobile device while operating the vehicle, the method comprising coupling the mobile device to vehicle at a position inaccessible to an operator of the vehicle to permit operation of the vehicle is described.

In an additional aspect, a kit for preventing text messaging while driving, the kit comprising a memory unit comprising a method to prevent operation of the vehicle when a mobile device is not coupled to the vehicle and to allow operation of the vehicle when the mobile device is coupled to vehicle, and instructions for flashing the engine control unit of a vehicle with the method on the memory device is disclosed.

In another aspect, a kit for preventing text messaging while driving, the kit comprising memory means for flashing an engine control means with a method to prevent operation of the vehicle when a mobile device is not coupled to the vehicle and to allow operation of the vehicle when the mobile device is coupled to vehicle, and instructions for using the memory means is provided.

In an additional aspect, a method comprising determining if a vehicle is constructed and arranged to receive an input from a mobile device, the vehicle configured to prevent operation of the vehicle when the mobile device is not coupled to the vehicle and to allow operation of the vehicle when the mobile device is coupled to vehicle, and providing an insurance policy cost estimate based on the determined vehicle is described.

In another aspect, a method comprising determining if a vehicle is constructed and arranged to receive an input from a mobile device, the vehicle configured to prevent operation of the vehicle when the mobile device is not coupled to the vehicle and to allow operation of the vehicle when the mobile device is coupled to vehicle, and providing an insurance policy based on the determined vehicle is disclosed.

In an additional aspect, a method of facilitating safe driving, the method comprising configuring a vehicle to be inoperable when a mobile device is not coupled to the vehicle and is configured to be operable when the mobile device is coupled to vehicle is provided.

In another aspect, a method of facilitating safe driving, the method comprising configuring a vehicle to be inoperable when a mobile device is not coupled to the vehicle and is configured to be operable when the mobile device is coupled to vehicle in a location inaccessible by a vehicle operator is described.

In an additional aspect, a method of facilitating safe driving, the method comprising providing a vehicle that is configured to be inoperable when a mobile device is not coupled to the vehicle and configured to be operable when the mobile device is coupled to vehicle in a location inaccessible by a vehicle operator is disclosed.

In another aspect, a method of facilitating safe operation of a public transit vehicle, the method comprising providing a drive vehicle of a public transit vehicle that is configured to be inoperable when a mobile device is not coupled to the drive vehicle and configured to be operable when the mobile device is coupled to drive vehicle of the public transit vehicle is provided.

In an additional aspect, a method of facilitating safe operation of a public transit vehicle, the method comprising providing a drive vehicle of a public transit vehicle that is configured to be inoperable when a mobile device is not coupled to the drive vehicle and configured to be operable when the mobile device is coupled to drive vehicle of the public transit vehicle in a location inaccessible by a drive vehicle operator is described.

In another aspect, a method of facilitating safe operation of a train, the method comprising providing a locomotive that is configured to be inoperable when a mobile device is not coupled to the locomotive and configured to be operable when the mobile device is coupled to locomotive in a location inaccessible by a drive vehicle operator is provided.

In an additional aspect, a method of facilitating safe operation of a train, the method comprising providing a locomotive that is configured to be inoperable when a mobile device is not coupled to the locomotive and configured to be operable when the mobile device is coupled to locomotive is described.

In another aspect, a method of facilitating safe operation of a train, the method comprising providing a locomotive that is configured to be inoperable when a mobile device is not coupled to the locomotive and configured to be operable when the mobile device is coupled to locomotive in a location inaccessible by a drive vehicle operator is disclosed.

In an additional aspect, a passenger vehicle configured to be inoperable when a mobile device is not coupled to the vehicle and configured to be operable when the mobile device is coupled to vehicle is provided.

In another aspect, a passenger vehicle configured to be inoperable when a mobile device is not coupled to the vehicle and configured to be operable when the mobile device is coupled to vehicle in a location inaccessible by a vehicle operator is described.

In an additional aspect, a commercial vehicle configured to be inoperable when a mobile device is not coupled to the vehicle and configured to be operable when the mobile device is coupled to vehicle is disclosed.

In another aspect, a commercial vehicle configured to be inoperable when a mobile device is not coupled to the vehicle and configured to be operable when the mobile device is coupled to vehicle in a location inaccessible by a vehicle operator is provided.

In an additional aspect, a commercial vehicle configured to be inoperable when first and second mobile devices are not coupled to the vehicle and configured to be operable when the first and second mobile devices are coupled to vehicle is described.

In another aspect, a commercial vehicle configured to be inoperable when first and second mobile devices are not coupled to the vehicle and configured to be operable when the first and second mobile devices are coupled to vehicle in a location inaccessible by a vehicle operator is provided.

In an additional aspect, a public transit vehicle configured to be inoperable when a mobile device is not coupled to the vehicle and configured to be operable when the mobile device is coupled to vehicle is disclosed.

In another aspect, a public transit vehicle configured to be inoperable when first and second mobile devices are not coupled to the vehicle and configured to be operable when the first and second mobile devices are coupled to vehicle is provided.

In an additional aspect, a vehicle configured for flight, the vehicle configured to be inoperable when a mobile device is not coupled to the vehicle and configured to be operable when the mobile device is coupled to vehicle is described.

These and other features and aspects are described in more detail below.

BRIEF DESCRIPTION OF THE FIGURES

Certain embodiments are described with reference to the figures in which.

DETAILED DESCRIPTION

Figure 1A:
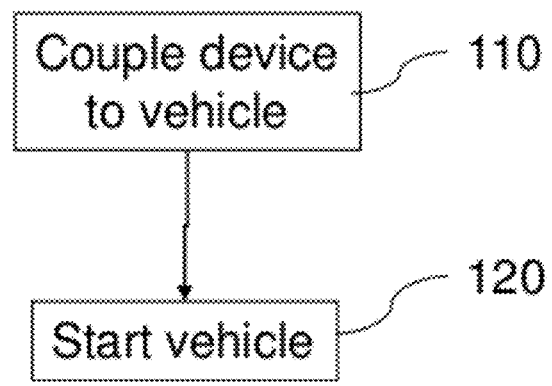
FIG. 1A is a flow chart of a method of controlling a vehicle, in accordance with certain examples.

Certain embodiments of the devices described herein can be used with passenger and commercial vehicles including automobiles, trucks, trains, buses, subways, airplanes or other devices that include a combustion engine, electric engine, fuel cell or other engine or device that can provide power to one or more wheels or other mechanisms of propulsion, e.g., a jet turbine. The exact configuration of the technology described herein can vary depending on the end-use application, and the configuration may desirably be different where the technology is used in a passenger vehicle as compared to using it in a commercial vehicle or public transit vehicle. Unless otherwise clear from the context of the usage, the term "public transit vehicle" is intended to encompass all vehicles designed to transport people including subways, buses, airplanes, taxis, or other above or below ground electric or combustion engine powered devices commonly encountered or used to travel from one place to another.

In certain embodiments, the devices, systems and methods described herein can provide many advantages including preventing non hands free mobile device functions, e.g., text messaging, while driving, reducing driver distraction, permitting hands free use of a mobile device and other desirable features such as mobile device charging. These and other advantages will be recognized by the person of ordinary skill in the art, given the benefit of this disclosure.

There are many drawbacks of existing systems used to increase vehicle safety. Some systems include complex sensors to detect proximity of the phone near a seat belt or head rest of a vehicle. See, for example, US 20100087137. Shielding of the phone signal can trick the sensors into thinking no phone is present. In addition, software means can be implemented to bypass the sensor system. Also, a "dummy" phone can be used to trick the system into thinking it has deactivated the operator's cellular phone.

In certain examples, the technology described herein can be used to disable non hands free functions of a mobile device, e.g., disable sending of text messages from a mobile device, or otherwise prevent a vehicle operator from using non hands free functions while operating the vehicle. In some examples, the entire mobile device can be rendered inoperative or unusable, e.g., by locking the keyboard, disabling the device, disabling the interface screen, etc., whereas in other examples hands free phone functions may still work and the mobile device may still be able to receive text messages. It may be desirable to disable audible receipt notices such that a vehicle operator is not distracted when a text message arrives at the mobile device. In certain embodiments, the technology described herein can be used to disable the visual interface of the mobile device such that a user is unable to interact manually with the mobile device when it is coupled to the vehicle. These and other features and configurations are described in more detail herein and additional features and configurations will be recognized by the person of ordinary skill in the art, given the benefit of this disclosure.

In some examples, the technology described herein may be used to prevent starting of a vehicle until the driver's mobile device is coupled to the vehicle. In other examples, a vehicle may be started without the mobile device coupled to the vehicle, but the vehicle may not be put into gear, e.g., switched into drive until the mobile device is coupled to the vehicle. In some examples, coupling of the mobile device may enable fuel to be provided to the engine, whereas in other examples, when a mobile device is not coupled, a fuel shut off can be implemented such that the vehicle may not be started. In certain embodiments described herein, the mobile device can be coupled to the vehicle in a wired or wireless manner. Notwithstanding that there are numerous ways to couple the mobile device to the vehicle, when coupled the mobile device desirably is not operative to send text messages by the operator of the vehicle and may also not be operative to use other non hands free functions present on the mobile device. The mobile device may still receive text messages, send and receive phone calls by Bluetooth® devices or other wireless units and perform other passive operations not requiring any input from the operator of the vehicle. Such desirable features permit a vehicle operator to receive messages and information while not being distracted by those messages and information during driving.

In some embodiments, the exact configuration of the mobile device can vary and illustrative examples of mobile devices include, but are not limited to, cellular phones, smart phones, laptops, handheld computers, personal digital assistants, enterprise digital assistants, Ipad® devices, Iphone® devices, mobile internet devices and other devices that can send and receive text messages, e-mail or other communications. In some embodiments, the mobile device can be configured to download a program to the vehicle or flash or reflash the processor, e.g., engine control unit of the vehicle, to include a method, software or a key to identify the particular mobile device, whereas in other examples, the mobile device couples to the vehicle but does not otherwise control the vehicle.

Figure 1B:
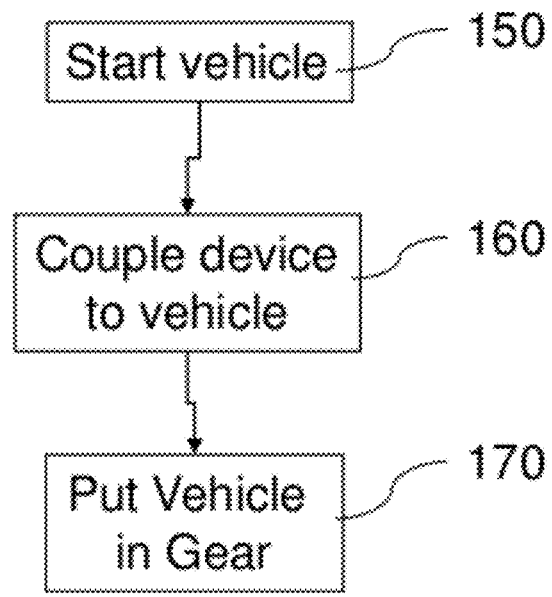
FIG. 1B is another flow chart of a method of controlling a vehicle, in accordance with certain examples.

In certain examples, one embodiment of the overall function of the device is shown in FIG. 1A. An operator first enters a vehicle. The operator then couples the mobile device to the vehicle at a step 110. Coupling of the mobile device allows the operator to start the vehicle at a step 120. Another embodiment of the overall function of the device is shown in FIG. 1B. The operator enters the vehicle and then starts the vehicle at step 150. The operator's mobile device is then coupled to the vehicle at step 160. The vehicle may then be shifted into gear, e.g., from park to drive, at step 170. In other examples, coupling of the mobile device to the vehicle may enable fuel to be provided to the engine of the vehicle.

Figure 2:
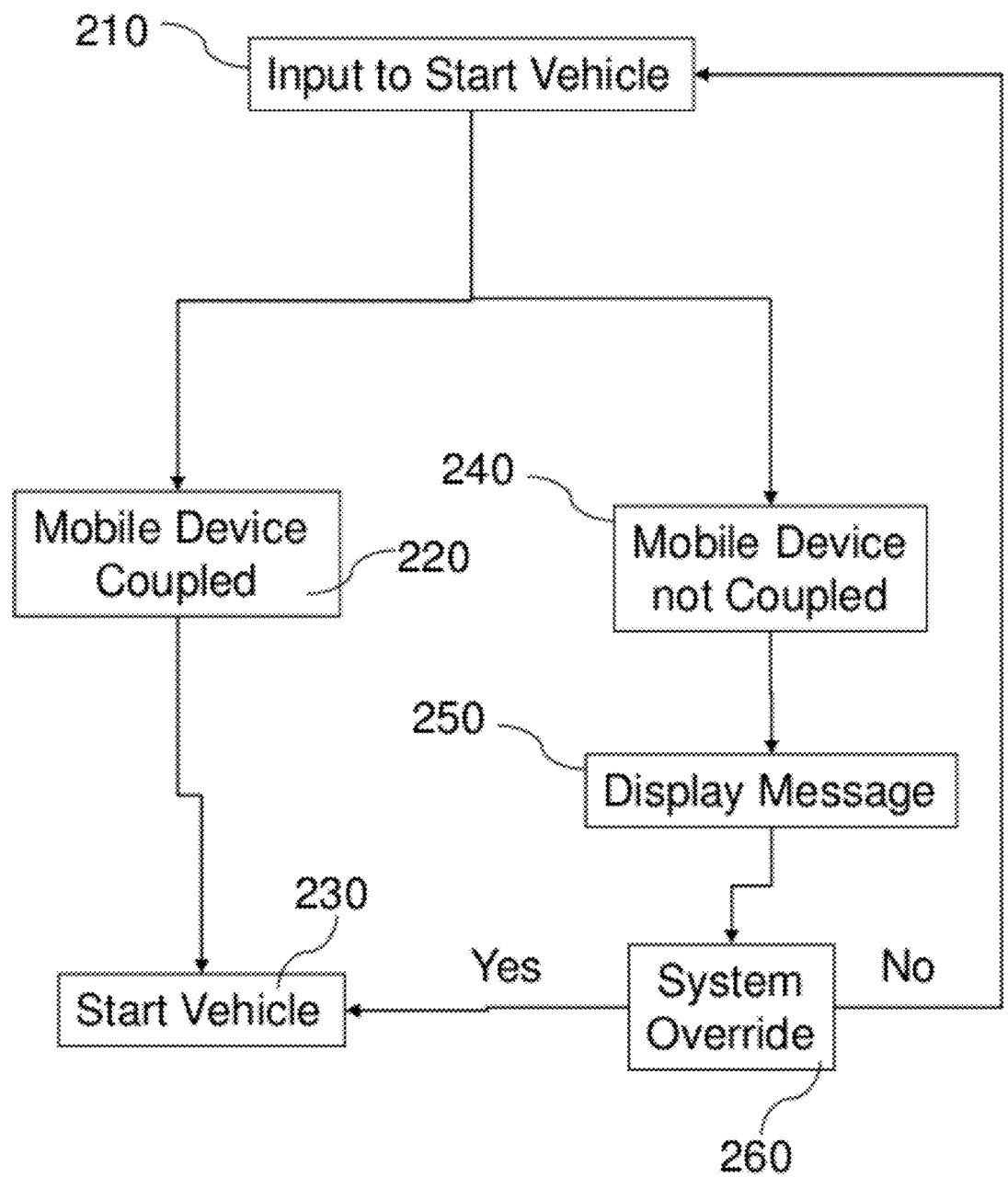
FIG. 2 is a flow chart of a method for coupling a mobile device to a vehicle, in accordance with certain examples.

In certain examples, the vehicle may include suitable hardware or software to verify whether or not the mobile device is coupled to the vehicle. For example, the vehicle may include a software program or implement a method that verifies that the mobile device is coupled. One illustrative method is shown in FIG. 2. The method includes receiving an input to start the vehicle at a step 210. As discussed elsewhere herein, such input may be turning of a ignition switch, pushing of a button or using the mobile device itself as a "key" to start the vehicle. Once the input to start the vehicle is received, the method would verify that the mobile device is coupled at a step 220. If the mobile device is coupled, then the vehicle would start at a step 230. If the mobile device is not coupled at a step 240, then the vehicle may display a message at a step 250 inquiring whether the operator would like to override the system at a step 260 or otherwise notify the vehicle operator that the mobile device is not coupled. If the override system is implemented by the operator, then the vehicle would start at a step 230. If the override system is not implemented by the operator, then the system would loop back to step 210 (or steps 240 or 250 if desired) to wait for operator input.

In certain embodiments, the exact form of the input to start the vehicle may vary. In certain instances, the input may be an operator turning an ignition switch that is standard on many vehicles. In other examples, the operator may push or activate a button. In addition examples, combinations of an ignition switch and a button can be used. In some examples, the mobile device itself may be operative as a key to start the vehicle. For example, the mobile device may include a unique identifier, e.g., a SIM card identifier or the like, which permits only the holder of the mobile device to operate the vehicle. Coupling of the mobile device by itself would permit starting of the vehicle, e.g., using a push button. As discussed elsewhere herein, the system can include one or more accounts, logs or lookup tables that can store the unique identifiers of authorized users. For example, an administrator may input the SIM card ID's of desired operators into the system such that only those operators would be able to start the vehicle. In other embodiments, the mobile device can be configured to receive a code that can be added into the phone before the phone is coupled to the vehicle to permit operation of the vehicle if the appropriate code is entered.

In certain examples, there may be instances where the vehicle must be moved or started and where the operator does not have a mobile device or an authorized mobile device. For example, the vehicle may need to be towed or otherwise operated by a non-authorized user for some time. When such a situation arises, the override system may permit operation of the vehicle without coupling a mobile device to the vehicle. The override system can be configured to permit operation of the vehicle for a configurable period selected by an administrator or for a pre-determined period present in the system. An operator may enter a code into a keypad, the navigation system or other vehicle interface present to permit starting of the vehicle in the absence of a coupled mobile device or to permit placing the vehicle in neutral for towing purposes. In some examples, the override system can be configured to permit operation of the vehicle at low speed or a speed no greater than a speed selected by an administrator, e.g., 10 mph, 5 mph or less, to permit movement by a dealer, a service department, valet or the like. In other examples, the override system can be configured to permit placement of the vehicle into neutral so that it can be towed. In yet other examples, the override system may permit full functioning of the vehicle. In some examples, the override system can be coupled to a tilt sensor such that it is automatically activated if the vehicle it tilted beyond a certain angle, e.g., when towing, to prevent damage to the vehicle's power train components. While the override system can be configured for activation through a keypad or the mobile device, it may also be coupled to a transmitter/receiver to receive a remote signal from a satellite or other mobile device. For example, if a vehicle operator loses their mobile device, a remote user can send an override signal to the override system of the vehicle to permit its operation in the absence of the mobile device. This feature is desirable, for example, in the event of mobile device loss or malfunction. In some examples, the override system can include a time-out feature such that after a selected number of incorrect entries, no new entries will be received by the override system for a pre-selected period, e.g., 1, 5 or 10 minutes.

Figure 3:
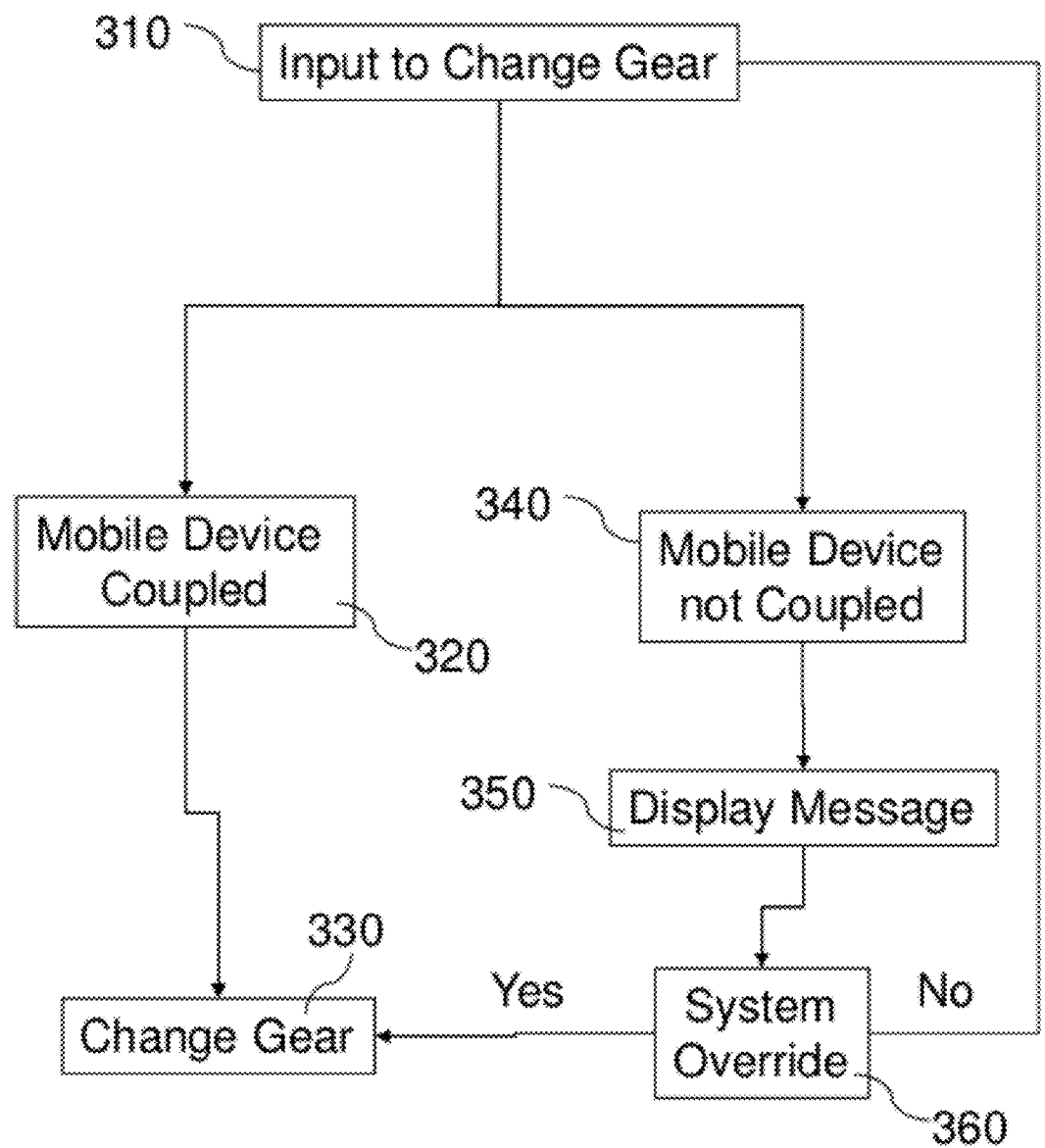
FIG. 3 is another flow chart of a method for coupling a mobile device to a vehicle, in accordance with certain examples.

In other embodiments, the method may permit starting of the vehicle but the vehicle may not be switched into gear prior to coupling of the mobile device. Referring to FIG. 3, the method includes receiving an input to change the gear from park at a step 310. If the mobile device is coupled at step 320, then the gear can be changed at a step 330 to permit driving of the vehicle. If the mobile device is not coupled (step 340), then the system may display a message at a step 350 inquiring whether or not the operator would like to override the system at a step 360 or otherwise notify the vehicle operator that the mobile device is not coupled. If the override system is implemented by the operator, then the vehicle would change gears at step 330. If the override system is not implemented by the operator, then the system would loop back to step 310 (or steps 340 or 350 if desired) to wait for operator input.

It will be recognized by the person of ordinary skill in the art, given the benefit of this disclosure, that other methods can be used to implement the technology described herein. In particular, any method that can limit starting of the vehicle or movement of the vehicle until a mobile device is coupled may be used to implement the technology described herein. Accessory devices or modules can be used to implement the technology, and such modules may be dealer installed, installed by a mechanic or installed by the vehicle owner.

In certain embodiments, either or both of the methods described in reference to FIGS. 2 and 3 can be used with existing sensors and devices in vehicles. For example, the system may use weight sensors built into the seat in combination with the coupling of the mobile device. If the weight sensor is activated, then the mobile device must be coupled before starting the vehicle or switching the vehicle gears. The seatbelt sensor can also be used in combination with the mobile device. For example, the system may be designed such that starting of the vehicle (or switching from park to drive) is not possible until both the operator's seat belt is fastened and the mobile device is coupled. Additional sensors including brake sensors, speed sensors, GPS tracking sensors and the like may also be used in combination with coupling of the mobile device. The sensors can work in combination with the mobile device to upload or store information to the mobile device including, but not limited to, vehicle average speed, top speed, fuel mileage, etc.

In certain embodiments, the mobile device itself may be used as the vehicle's key. In some examples, the system can implement a method that uses coupling of the mobile device in combination with entering of a unique identifier in an interface in the vehicle, e.g., a navigation system, keypad or the like. For example and referring to FIG. 4, an operator can couple a mobile device to a vehicle at a step 410. Once the mobile device is coupled, a unique identifier can be entered into an interface at a step 420. If the identifier matches with one in the system, then the vehicle may be started at a step 430. Alternatively, the transmission can be placed into drive (or reverse) once the unique identifier is entered (step not shown). If the unique identifier does not match the one in the system, the system can display a message at step 440 inquiring whether the operator would like to override the system at step 450. If the system is overridden, then the vehicle will start at a step 430. When the mobile device is not coupled, the system can display a message at step 460 inquiring whether the operator would like to override the system at step 470. If the system is overridden, then the vehicle will start at a step 430. As described herein, the mobile device may be used in a wired or a wireless manner as the vehicle's key.

Figure 4:
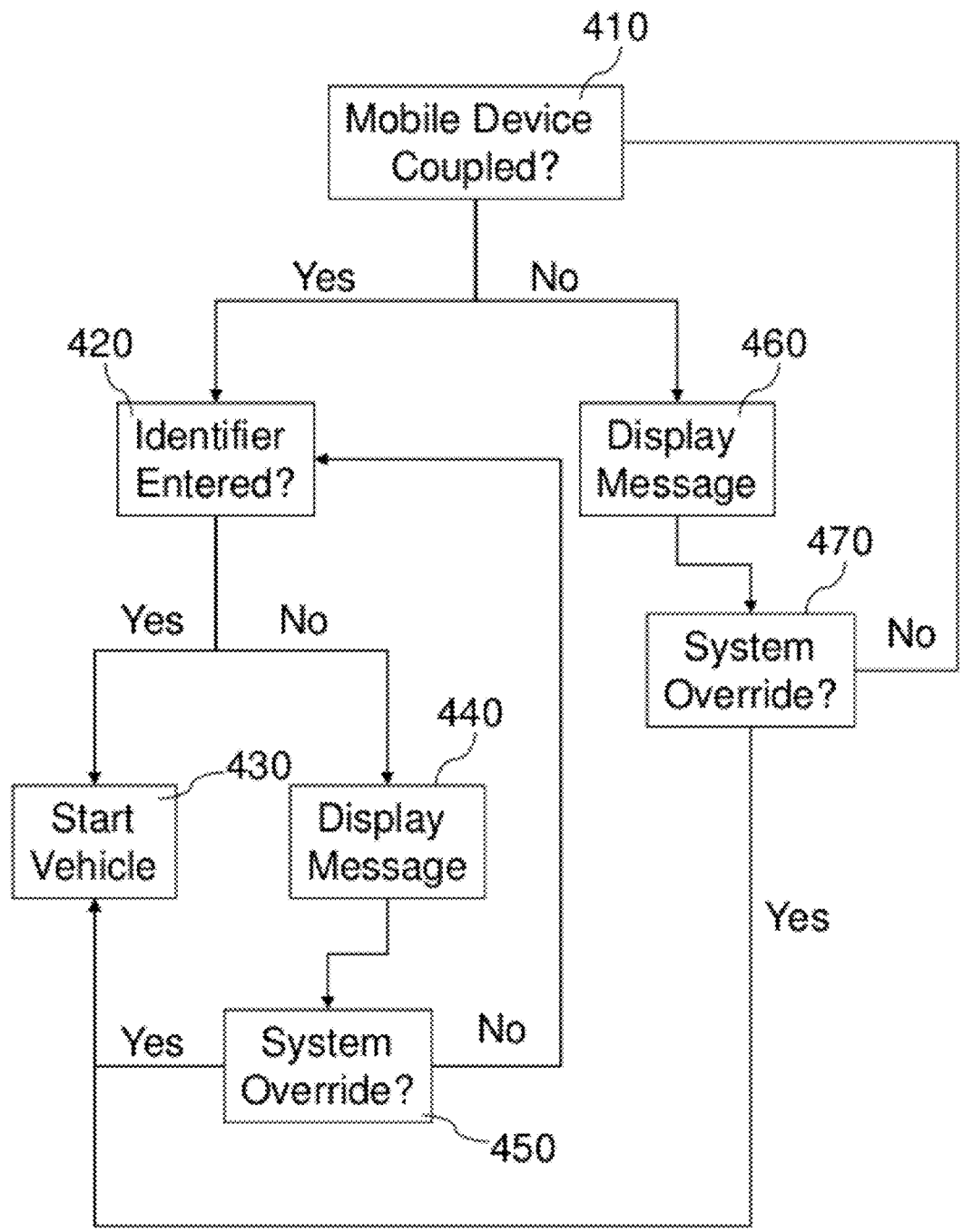
FIG. 4 is a flow chart showing verification of a mobile device coupled to a vehicle, in accordance with certain examples.

It will be recognized by the person of ordinary skill in the art, given the benefit of this disclosure, that the methods described in reference to FIGS. 2-4 are merely illustrative and certain steps may be omitted and other steps may be added. For example, the method may be implemented without the ability to override the system such that coupling of the mobile device to the vehicle is required to start the vehicle or change the gear of the vehicle.

In certain embodiments, when the mobile device is coupled to the vehicle, the mobile device may be rendered "dumb" such that texting or other features that require manual input are disabled. In some instances, it may be desirable to disable all features of the mobile device, whereas in other examples, the device may be able to receive incoming phone calls but substantially all other features are disabled as long as the device remains coupled to the vehicle.

Figure 5A:
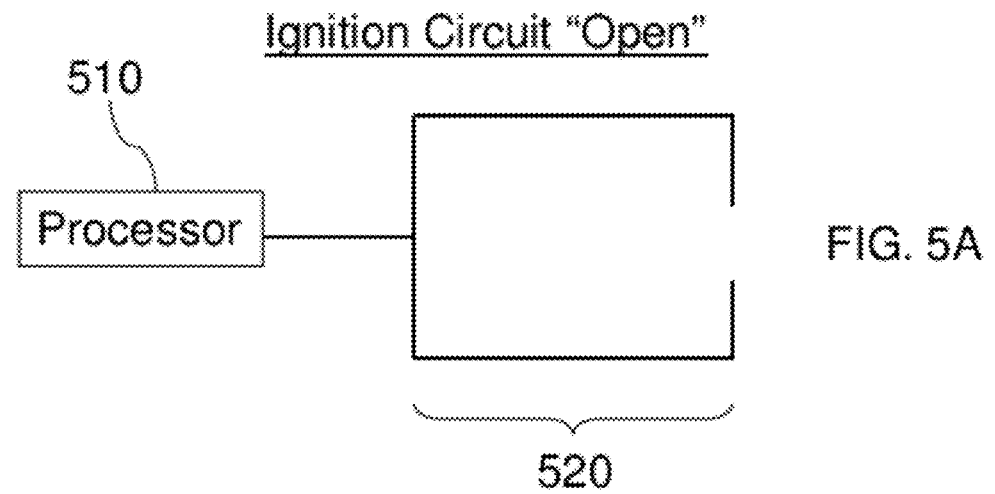
FIGS. 5A and 5B are schematics showing open and closed ignition circuits, in accordance with certain examples.
Figure 5B:
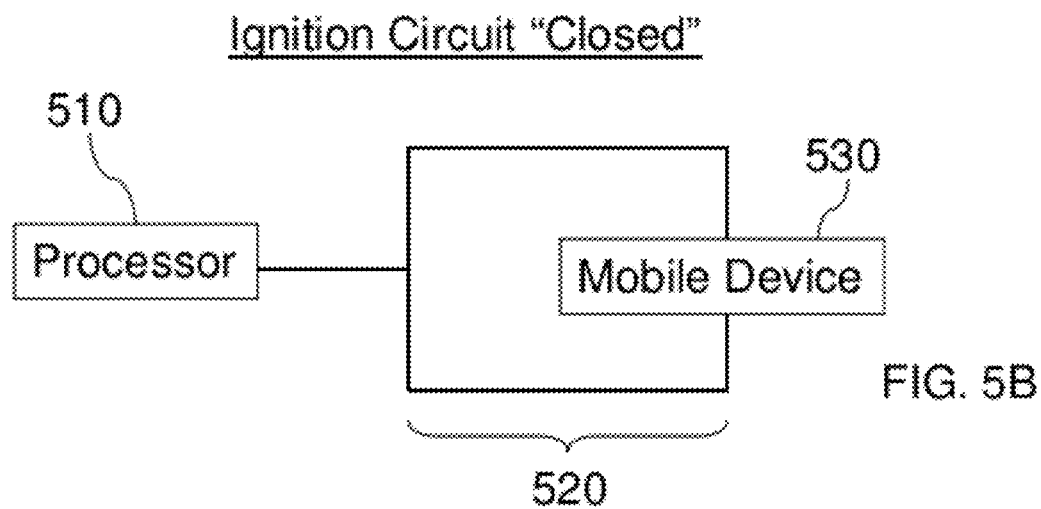

In certain embodiments, coupling of the mobile device to the vehicle can complete an ignition circuit such that the vehicle may start. The mobile device can act as a switch to close the circuit. For example, a simplified schematic of a part of a vehicle's electrical system is shown in FIGS. 5A and 5B. The electrical system includes a processor 510, which is typically housed in, or electrically coupled to, an engine control unit (ECU) which itself may include or be electrically coupled to an ignition circuit 520. The ignition circuit 520 is open when the mobile device is not coupled such that the engine will not start (FIG. 5A). When a mobile device 530 is coupled (FIG. 5B), the ignition circuit is closed such that the processor 510 will permit the engine to be started once a suitable input is received, e.g., turning of the ignition switch, pushing an ignition button, etc. The method can be implemented, for example and as discussed further below, by modifying the lookup tables (LUTs) in the ECU such that the coupling of the mobile device must be present to start the vehicle.

Figure 6A:
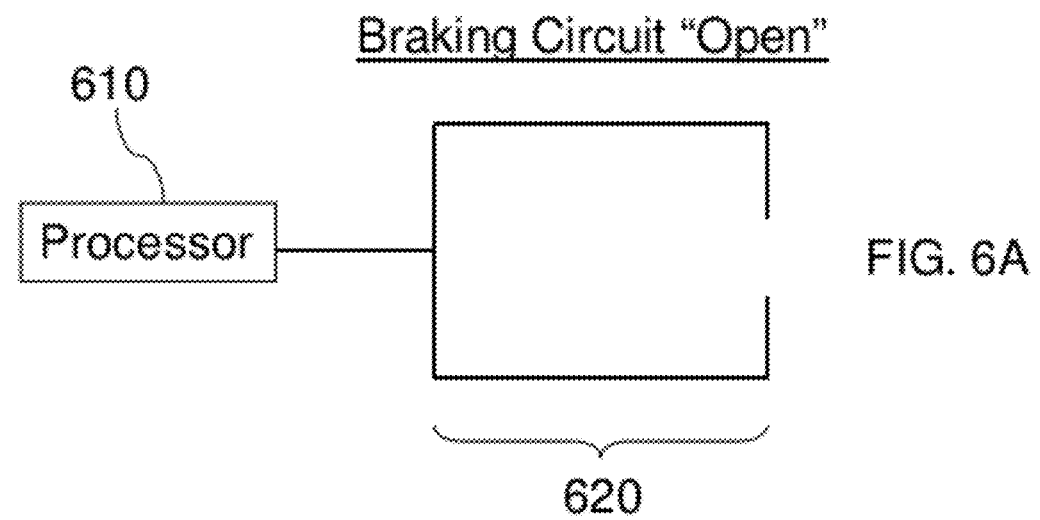
FIGS. 6A and 6B are schematics showing open and closed braking circuits, in accordance with certain examples.
Figure 6B:
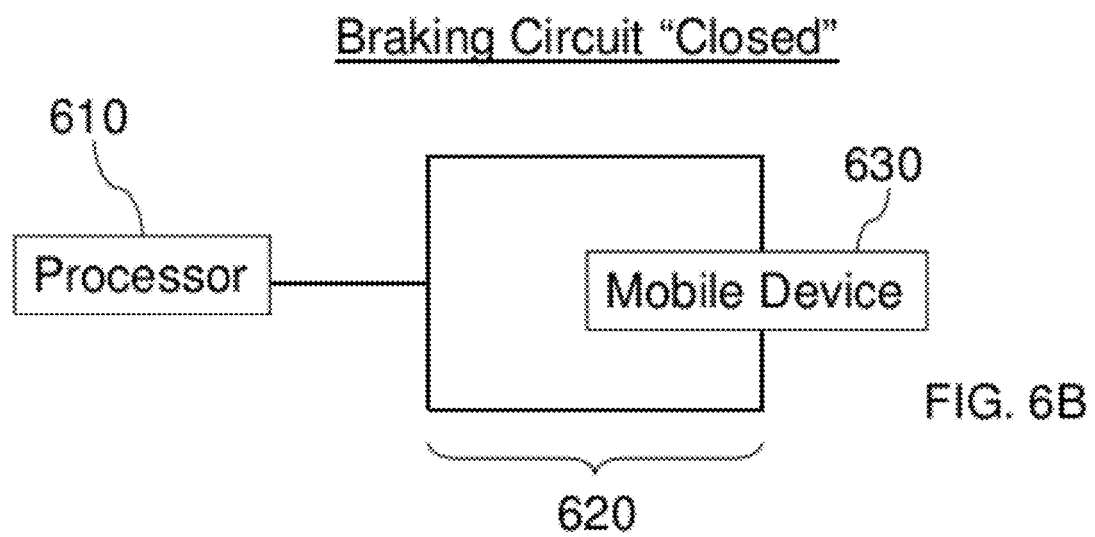

In some examples, a similar system can be implemented as part of the braking circuit. In many newer vehicles, a user must depress the brake pedal prior to being able to shift the vehicle into gear. Coupling of the mobile device to the braking circuit can close the braking circuit and permit shifting of the vehicle into gear. Referring to FIGS. 6A and 6B, a braking circuit 620 may be considered open when the mobile device is not coupled even when the brake is depressed by a user. Once a mobile device 630 is coupled to the system, the processor 610 will permit shifting of the transmission from park to a gear selected by an operator.

Figure 7A:
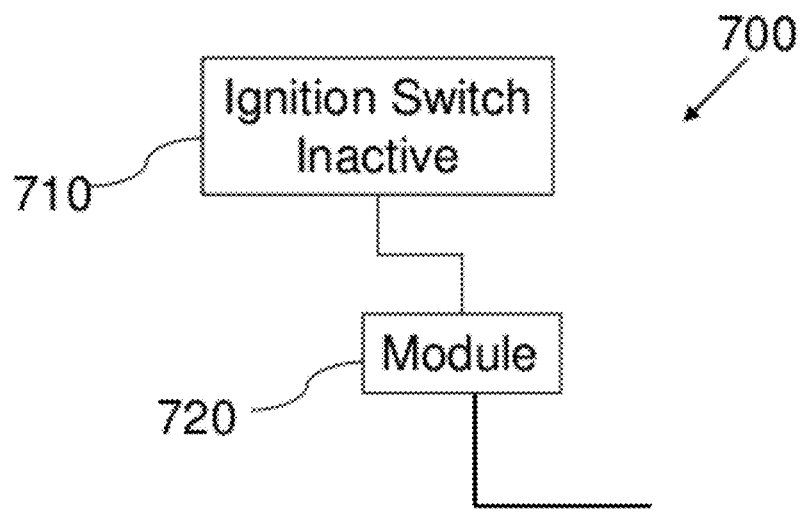
FIGS. 7A and 7B are schematics showing an in-line module, in accordance with certain examples.
Figure 7B:
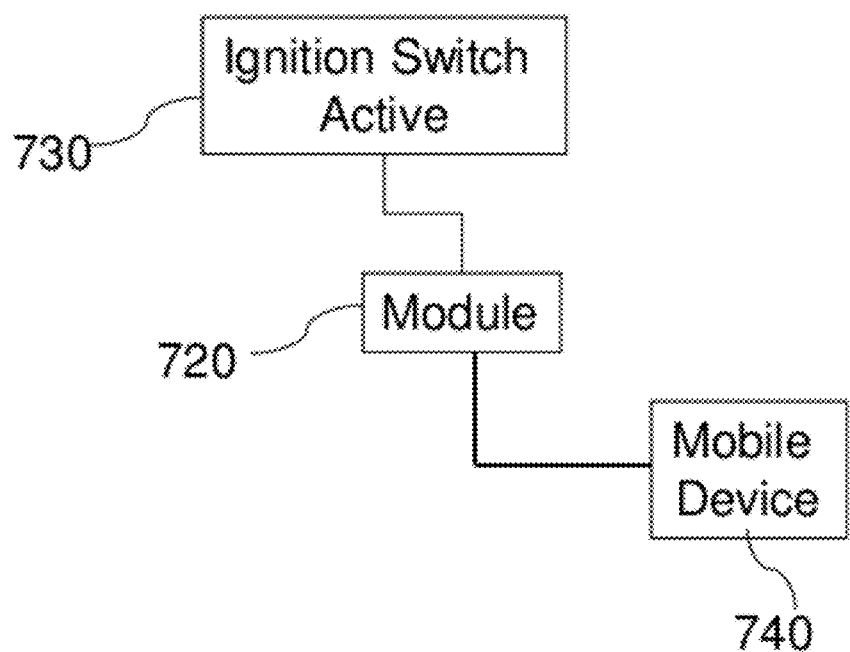
Figure 8A:
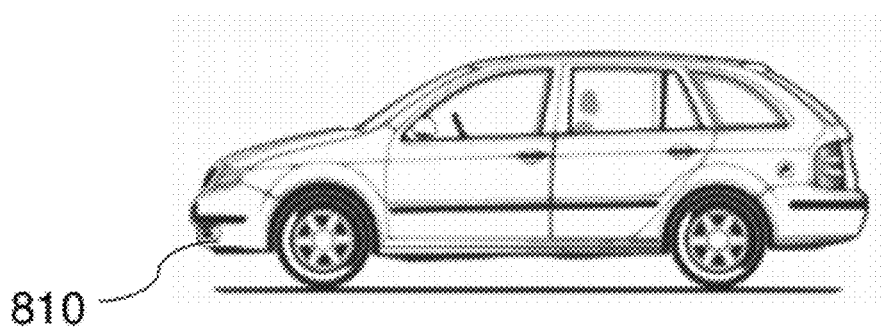
FIGS. 8A-8E are illustrations of vehicles, in accordance with certain examples.
Figure 8B:
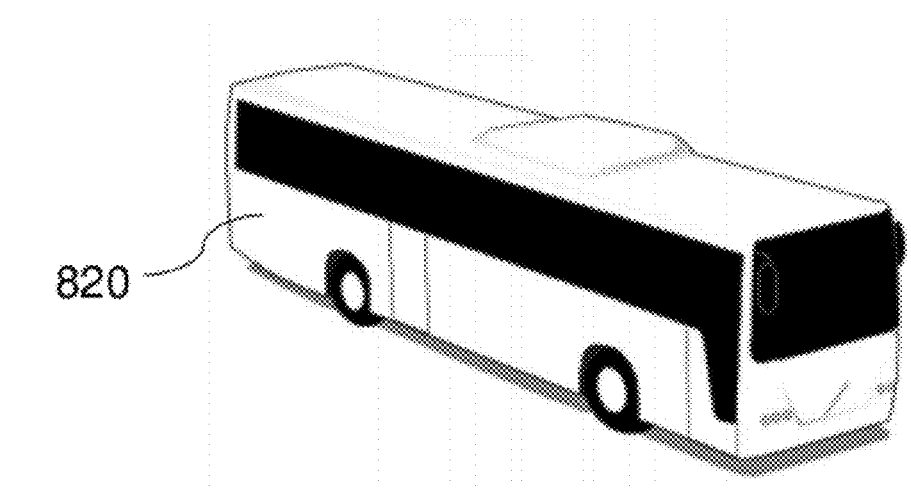
Figure 8C:
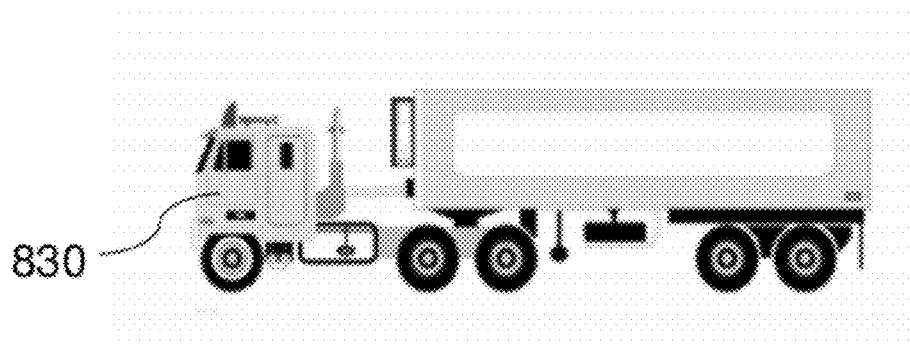
Figure 8D:
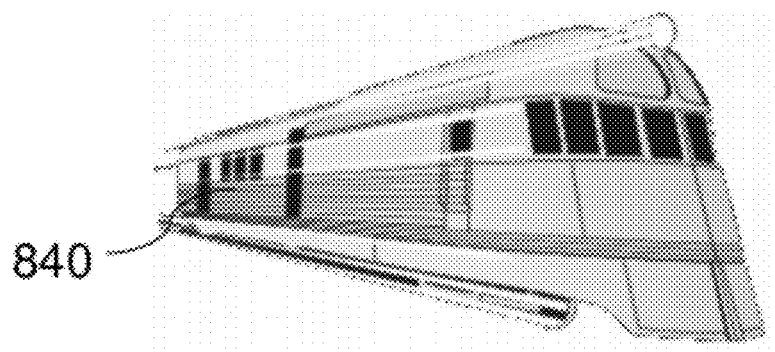
Figure 8E:
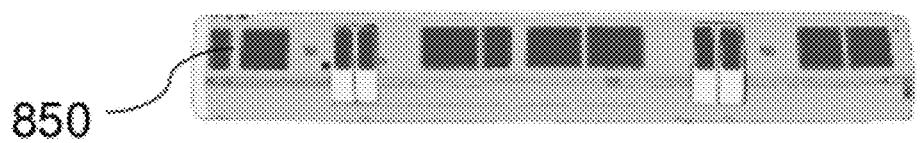

In some examples, it may be desirable to include an in-line switch or box that can be electrically coupled to the vehicle to permit operation of the vehicle when the mobile device is coupled and prevent operation of the vehicle when the mobile device is not coupled. For example, in older vehicles not including electronic management systems, it may be desirable to include a module on the cold side of the ignition switch as shown in the schematics of FIGS. 7A and 7B. The system 700 would include a module 720 inline with an ignition switch. Where a mobile device is not coupled to the module 720 (see FIG. 7A), the ignition switch would be in an inactive state 710, and the vehicle would not be able to start. When a mobile device 740 is coupled to the module 720 (see FIG. 7B), then the ignition switch would be in an active state 730 such that turning of the key by an operator would permit starting of the vehicle. The module 720 need not be in the ignition circuit. For example, the module may be inline with a braking circuit, with a fuel shut off circuit, etc., such that the vehicle can not be operated without coupling of a mobile device to the module. In operation, the module 720 would typically authenticate a SIM card (or other unique identifier) of the mobile device to permit operation of the vehicle. In some embodiments, the module 720 can be configured with electrical taps such that it can be added to a vehicle by inserting the module 720 inline with existing ignition wiring in the vehicle.

In certain examples, the mobile device can be coupled to the system through a wired coupler that is electrically coupled to at least some portion of the vehicle. While the term "wired" is used in certain instances, there may be no actual wire present. "Wired" refers to physical contact of some portion of the phone with some portion of the system. For example, a mini-USB port on the phone may interface with a mini USB port on the system by plugging the phone directly into the USB port of the system without any intervening wire between the two ports. In other examples, a coupling from a navigation unit may exist such that the mobile device is coupled to the navigation unit. By coupling the mobile device to the navigation unit, the vehicle may then be started or switched into gear.

In certain embodiments, the exact design of the wired coupler is not critical and desirably the coupler is selected such that it will work with about 80% of existing mobile devices such as cellular phones. In some examples, the vehicle can include two or more different types of wired couplers to increase the overall compatibility of the system. In some examples, each of the couplers can be controlled by an administrator and may be selectively activated and deactivated based on settings selected by the administrator. In addition, adapters, dongles and the like can be used to permit coupling of a mobile device to a wired coupler. Illustrative types of couplers include, but are not limited to, those having one or more of a USB interface, a mini USB interface, a micro USB interface, a serial ATA interface, a PS/2 interface, a MIDI interface, a serial bus interface, an IEEE 1394 interface and the like. While not required, it is desirable that the interface provide coupling of the mobile device to the system while at the same time charging (or keeping charged) the mobile device.

In some examples, the coupler can be constructed and arranged to lock the phone into place during operation of the vehicle. For example, the coupler can include actuatable tabs, bosses, projections, etc. that mate to slots or receptacles on the mobile device to lock the mobile device into place when the vehicle is running or otherwise being operated. Such a locking device prohibits removal and use of non hands free functions of the mobile device while operating the vehicle.

In certain embodiments, the coupler of the device can be configured as a cradle, socket, docking station or any device configured to receive the mobile device or a slot that can receive some portion of the mobile device. For example, the coupler can be configured as a cradle that receives the face of the mobile device such that a user cannot manually enter commands while the mobile device is coupled. As discussed herein, the coupler may include a cord or wire, but such coupling devices can be less than desired as they may permit the operator to still use the mobile device while it is coupled to the vehicle. In such instances, it may be desirable to disable the display of the mobile device or otherwise render some portion of the mobile device "dumb," e.g., lock the keyboard, such that the operator cannot manually interact with the mobile device while operating the vehicle.

In certain examples, the exact positioning of the coupler in the vehicle can vary from vehicle to vehicle and from system to system. In some examples, the coupler can be positioned in a storage compartment, e.g., glove compartment, trunk, under seat storage device, storage in a door or between the front fender well and the front portion of the door or other areas of the vehicle. In certain instances, the storage compartment can receive substantially all of the mobile device, whereas in other examples a portion of the mobile device may protrude or otherwise be viewed when it is coupled to the vehicle. In some examples, the coupler is positioned such that it renders the mobile device inaccessible to a vehicle operator. For example, the coupler may be positioned in the glove compartment, in a driver seat box, under the driver's seat, under the driver seat cushion, in an umbrella drawer or compartment, in the trunk, under the hood in the engine compartment, in the headliner, at the side of one of the seats or other areas where it would be difficult or impossible for the driver to use non hands free functions of the mobile device when coupled to the vehicle. In other examples, the coupler can be positioned in, or otherwise be part of, one of the cup holders of the vehicle.

In certain embodiments, the coupler can be configured to permit the mobile device to perform other functions including data transfer, charging of the mobile device, communicating with the navigation system of the vehicle and the like. If desired, the mobile device can be used for data logging to track speed, gas mileage or other performance parameters of interest to a vehicle operator.

In certain examples, coupling of the mobile device to the vehicle may permit uploading or transfer of user specific parameters from the mobile device to the vehicle. For example, an identifier on the mobile device, e.g., a SIM card, code or the like, can be used by the vehicle to ascertain the particular vehicle operator. User specific or user-specified parameters include, but are not limited to, the position of the seat, radio stations, HVAC settings, pre-stored navigation routes, speed limiter and the like, and such parameters may be automatically adjusted based on pre-selected or pre-stored user specific parameters that are correlated to the identifier of each mobile device. The lookup tables in the system may include default or selected maps or parameters that can be used if the identifier of the mobile device do not match those in the lookup table.

In certain embodiments, in implementing the methods and systems described herein, the vehicle can be retrofitted with a new processor and/or memory unit, e.g., an ECU, and the ECU can be flashed with a new software program that can implement the methods described herein, the method can be implemented on a dongle or device that couples to the vehicle through the OBDII port, the method can be implemented as part of a navigation system, e.g., factory or aftermarket navigation systems, or the mobile device itself may include a method that prevents operation of the mobile device once it is coupled to the vehicle. In embodiments where a new ECU is installed, a dealer, factory or OEM company may produce a replacement ECU that is vehicle specific and includes suitable software to implement vehicle controls, e.g., valve timing, transmission shift points, etc. The new ECU may also include a method that can detect the presence or absence of a coupled mobile device, e.g., through voltage sensing, receipt of a signal or message from the mobile device, completion of an open circuit when the mobile device is coupled, etc. The new ECU can be installed at a dealer or can be replaced by a vehicle owner where the ECU is properly configured.

In other embodiments, the ECU may be "flashed" or "re-flashed" where a different software program is uploaded to the ECU through an OBDII port, an accessory power port or by otherwise coupling a loading device to the ECU. In some instances, for example, the mobile device itself may include the software program that can be used to flash the ECU. Upon first coupling of the mobile device with the ECU, the mobile device may prompt the user to select certain parameters, e.g., vehicle year, make and model, such that a proper software program is uploaded to the ECU to permit suitable vehicle functioning and to implement the technology described herein. In some examples, a software program may be implemented using a reader device, e.g., code scanner, or other device, e.g., a laptop, Ipad® device or mobile computer, that can be implemented to upload a program or flash an ECU, such as those commonly available from many manufacturers including, but not limited to, Hypertech, Inc., Bully Dog Technologies, Edge Products and other manufacturers that commonly produce performance chips and performance software tools.

In certain embodiments, the method may permit different levels of user access. For example, the method may have an administrator setting that permits an administrator to add authorized users to the vehicle. Such users can be added with user-specified parameters such that the administrator can set the vehicle based on each user. For example, the administrator may select speed limiter settings for a particular user, may adjust mirror or seat positions, may switch on GPS tracking features for a particular user to monitor the position of that user, may switch on an alert system if the vehicle is driven beyond a certain distance or outside a certain area or may otherwise control each operator's ability to use the vehicle based on an identifier or other criteria associated with their mobile device. The system can also include user level access that permits the users to operate the vehicle but does not permit overriding of any user-specified parameters stored in a lookup table or elsewhere in the system. In certain embodiments, the administrative functions may reside with a centralized service, e.g., GM's Onstar® service, such that unwanted access by an outsider is not easily obtained. In other examples, the administrator may be able to control the system remotely through the internet or through a wireless device such as a mobile device. In such instances, the administrator can control the user-specified parameters in real time (or almost real time) so they can be adjusted as desired or needed. In addition, the administrator can activate a temporary key or the override system remotely to permit operation of the vehicle if the user's mobile device is lost or inoperative. Administrator selected settings are typically stored in one or more lookup tables on a memory unit, which may be separate from the ECU of the vehicle, may be integral to the ECU or may be stored remotely from the vehicle.

In certain embodiments, the ability to monitor the vehicle using the system provides several advantages in commercial settings. Vehicle positions can be monitored in real time to determine delivery times, arrival times, delays, a vehicle's current position and the like such that efficiency in delivery and monitoring may be increased. In addition, a vehicle may be disabled after a certain driving period, e.g., 10 hours, to comply with department of transportation regulations and the like. Data logging can be implemented to keep track of vehicle parameters, routes, traffic information, e.g., based on average vehicle speed, and other desired information.

In certain embodiments, the systems described herein can be used in conjunction with an additional coupler. For example, in commercial settings, a vehicle operator may have both a personal mobile device and a company provided mobile device. In such instances, it may be desirable to require the vehicle operator to couple both devices so that they cannot send text messages from their personal device while coupling the company-provided device to permit operation of the vehicle. The system may be configured to include two couplers with one of the couplers being configured to couple to each of the mobile devices. When both mobile devices are coupled, the vehicle may be operated as described herein. An administrator can selectively activate or deactivate each of the coupler using the administrative functions of the technology.

In certain examples, the system can include audible reminders or visual displays to retrieve the mobile device once the vehicle is switched off. For example, the system may provide an audible beep similar to the ones commonly used to remind a driver their keys are in the ignition. In certain examples, a driver information display may provide a message to retrieve the mobile device, or the mobile device may be automatically ejected when the vehicle engine is switched off. Other user friendly features may also be included in the system to facilitate operation of the vehicle and subsequent retrieval of a user's mobile device.

In certain embodiments, the systems described herein may include other sensors, devices, units and the like that work in conjunction with coupling of the mobile device. For example, a GPS unit of the mobile device may work in conjunction with the vehicle to provide feedback to a monitoring site regarding the position of the vehicle. Rather than implement a separate tracking system in each vehicle, a company provided mobile device can be used to track the vehicle through the internet or other interface. This feature greatly reduces tracking costs while at the same time increasing driver safety by preventing text messaging by the vehicle operator.

In certain embodiments, the mobile device can be wirelessly coupled to the vehicle. Such wireless coupling may take numerous forms including wireless coupling with an existing transmitter/receiver of the vehicle such as a Bluetooth® device. In such instances, it may be desirable to disable the mobile device when wirelessly coupled to prevent non hands free operation of the mobile device. For example, when wirelessly coupled, a handshake between the mobile device and vehicle can be established such that the vehicle may be operated. As long as the handshake is present, the mobile device may remain deactivated to prevent non hands free operation such as sending of text messages. Wireless coupling provides the advantage of not using a coupler specific for a certain type of mobile device.

In some examples, the mobile device can be used in conjunction with the system to be operative as a car key. For example, the system can be configured with a circuit electrically coupled to a processor and configured to receive an input from a mobile device to prevent operation of a vehicle when the mobile device is not coupled to the circuit and to permit operation of the vehicle when the mobile device is coupled to the circuit. The processor (or circuit) can be further configured to compare an identifier of the mobile device to an entry in a lookup table to permit operation of the vehicle if the identifier matches the entry in the lookup table. where the mobile device is wirelessly coupled to the vehicle, the mobile device may permit entry of a code on the mobile device, depression of a "Start" button on the mobile device or other input can be entered into the mobile device to permit starting of the vehicle. In instances where the mobile device will be disabled, there may be a delay period, e.g., a few seconds or more, prior to disabling to permit entry of such code or input. In other instances, authentication of the SIM card of the mobile device can permit starting of the vehicle by pressing a button or other device integral to the vehicle without the need for any input on the mobile device.

In certain embodiments, an administrator may add the entries in a lookup table based on the identifiers of mobile devices of authorized users. In other examples, an authorized user may couple their mobile device to the system, and an entry can be written to the lookup table to permit the user to operate the vehicle. The written entry may be approved by an administrator or in certain instances no approval may be required. As discussed herein, the system can be configured to adjust user-specified parameters, e.g., seat position, radio stations, speed limiter, etc., using the entries in the lookup table. Once an entry is verified, the user may start or operate the vehicle by pressing a button, e.g., either on the mobile device or on the vehicle itself without needing a physical key to be placed in an ignition switch. As described herein, the car key system may include a coupler that is configured to couple the mobile device to provide the input from the mobile device to the processor of the car key system. This coupler may take many different forms including a cradle, docking station, socket, USB port and the like and/or may be positioned in the vehicle out of reach of a vehicle operator or in a manner to be inaccessible to a vehicle operator. In other embodiments, the coupler may be configured such that the mobile device is accessible to a vehicle operator but is not usable, e.g., the screen is locked, the keyboard is locked, non hands-free functions are disabled, etc.

In certain examples where a car key system is present, the system can include an override system configured to permit operation of the vehicle when the mobile device is not coupled to the circuit. This override system may be particularly advantageous for non-authorized drivers to operate the vehicle or for temporary access to the vehicle. In some examples, the override system can be configured to permit operation of the vehicle at speeds less than a top speed selected by an administrator, e.g., less than 10 miles per hour, to only permit shifting of the transmission into neutral or to permit other administrator specified functions. The override system can, for example, be activated with a keypad or can be activated using a remote signal.

In embodiments where the car key system is used in a commercial vehicle, it may be desirable to base the system on two or more mobile devices. The key to starting the vehicle would be coupling of both mobile devices optionally in combination with entry of a code on a keypad, depressing a button, etc. The circuit can be configured, for example, to permit operation of the vehicle only when both mobile devices are coupled to the system. Where two or more devices are needed to couple to the system, each of the devices may be coupled by wire, one device may be coupled by wire and the other device may be wirelessly coupled or both devices may be wirelessly coupled.

In certain examples, the car key system may desirably include or work with other sensors and features including weight sensors, ABS sensors, GPS devices, tracking devices, navigation systems, entertainment systems and other vehicle systems. It is not intended that the use of any of the illustrative embodiments of car key systems described herein limit the other potential systems that can be used in a vehicle.

In certain embodiments, a vehicle comprising an engine, a processor configured to control the engine, and a circuit electrically coupled to the processor and configured to receive an input from a mobile device may be used. In some examples, the circuit can be constructed and arranged to prevent operation of the vehicle when the mobile device is not coupled to the circuit and to allow operation of the vehicle when the mobile device is coupled to circuit. In certain instances, the vehicle may include a fixed program such that a user cannot alter or otherwise delete the program to bypass the program.

In certain embodiments of the vehicle, the circuit can be configured to prevent starting of the engine when the mobile device is not coupled to the circuit and to allow starting of the engine when the mobile device is coupled to circuit. In other embodiments, the circuit is configured to prevent shifting of the vehicle into drive when the mobile device is not coupled to the circuit and to allow shifting of the vehicle into drive when the mobile device is coupled to circuit. In some embodiments, the vehicle can include a coupler electrically coupled to the processor and configured to couple to the mobile device to provide the input from the mobile device to the processor. As discussed herein, the coupler may take many different forms including, but not limited to, a cradle socket, docking station or other device configured to receive the mobile device. If desired, the coupler can be positioned in the vehicle out of reach of a vehicle operator or otherwise be inaccessible to the operator during operation of the vehicle. The coupler may permit wired or wireless coupling of the mobile device to the vehicle, may charge the mobile device, and can provide other desired functionality. In certain examples, text messaging functions or all non hands free functions of the mobile device can be disabled when the mobile device is coupled to the circuit.

In some embodiments, the vehicle can include an override system configured to permit operation of the vehicle, e.g., for a configurable period or a pre-selected period, when the mobile device is not coupled to the circuit. For example, the override system is configured to permit operation of the vehicle at less than a selected top speed, e.g., speeds less than 10 miles per hour, can be configured to only permit shifting of the transmission into neutral and, if desired, can be activated using a remote signal.

In other embodiments, the vehicle can be configured to implement at least one user-specific parameter based on an identifier on the mobile device. In some examples, the vehicle can include a memory unit electrically coupled to the processor and configured to receive a method that prevents operation of the vehicle when the mobile device is not electrically coupled to the circuit and to allow operation of the vehicle when the mobile device is electrically coupled to circuit.

In certain embodiments, the vehicle can include a second coupler electrically coupled to the processor and configured to couple to a second mobile device. In some embodiments, the system can be configured to permit operation of the vehicle only when the mobile device and the second mobile device are both coupled to the system.

In certain embodiments, the vehicle may include additional sensors and devices. For example, the vehicle can include a sensor coupled to the processor, the sensor configured to provide feedback to a vehicle operator to retrieve the mobile device when the engine of the vehicle is switched off. In other examples, the vehicle can include a GPS device electrically coupled to the processor to permit tracking of the vehicle.

In some examples, the type and nature of the engine in the vehicle is not limiting, and the vehicle may be a vehicle including an electric engine, a combustion engine, a fuel cell, a magnetic engine, an electric motor, a steam engine, a gas engine, e.g., a hydrogen engine or combinations thereof. Similarly, the type of vehicle is not limited. Referring to FIGS. 8A-8E, the vehicle may be a passenger vehicle 810, a bus 820, a commercial truck 830, a train 840, a subway 850, an air vehicle such as an airplane or other vehicles where operator distraction may decrease safe operation. The vehicles typically include drive means such as an engine to cause the vehicle to move forward, backward or in a desired direction. For example, an engine can be used to drive two or more wheels of a vehicle.

Figure 9:
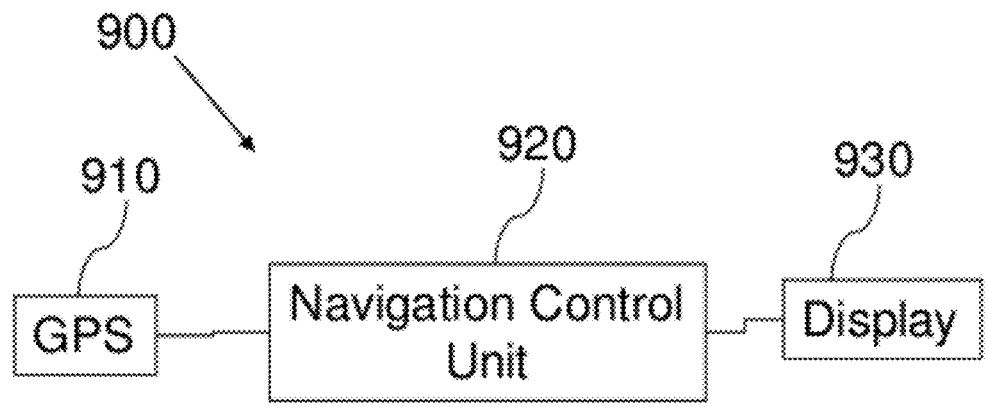
FIG. 9 is a schematic of a navigation system, in accordance with certain examples.

In certain examples, a navigation system can be configured to work with or implement the methods described herein. Referring to FIG. 9, a navigation system 900 includes a navigation control unit 920, which typically houses a processor and a memory unit. The navigation control unit 920 is electrically coupled to a global positioning sensor 910 and a display 930. In an illustrative navigation system, a memory unit is electrically coupled to the processor and comprises navigation information. The navigation system 900 can also include a circuit electrically coupled to the processor and configured to receive an input from a mobile device, the circuit constructed and arranged to prevent operation of the vehicle when the mobile device is not coupled to the circuit and to allow operation of the vehicle when the mobile device is coupled to circuit. In some examples, navigation information may include, for example, current position, route display, route planning and other common information provided by existing navigation systems to guide a user to a selected destination.

In certain embodiments, the circuit can be electrically coupled to a coupler configured to couple to the mobile device. In some embodiments, the coupler can be positioned out of reach of a vehicle operator or be inaccessible during operation of the vehicle. In other embodiments, the coupler can be electrically coupled to a wireless unit to permit wireless coupling of the mobile device to the coupler. In additional embodiments, the navigation system can include a wireless phone unit to permit hands free calling from the mobile device when the mobile device is coupled to the navigation system. In some embodiments, the processor (or circuit) can be configured to compare an identifier of the mobile device to an entry in a lookup table to permit operation of the vehicle if the identifier matches the entry in the lookup table. In certain embodiments, the navigation system can be configured to display a reminder to retrieve the mobile device when the vehicle is switched off. In other embodiments, the navigation system can include a second coupler electrically coupled to the processor and configured to couple to a second mobile device. Where two or more couplers are present each coupler may independently be configurable by an administrator. In some examples, the circuit can be configured to permit operation of the vehicle only when the mobile device and the second mobile device are both coupled to the system. In other examples, the circuit can be configured to permit operation of the vehicle once the mobile device is coupled without the use of a separate key. In additional examples, the navigation system can include an override system configured to permit operation of the vehicle, e.g., for a configurable period or for a pre-selected period, when the mobile device is not coupled to the circuit. For example, the override system can be configured to permit operation of the vehicle at less than a selected speed, e.g., speeds less than 10 miles per hour, can be configured to only permit shifting of the transmission into neutral, or can be activated using a remote signal.

In certain examples, the navigation system can include a transmitter/receiver electrically coupled to the circuit and configured to receive input from a remote user. For example, the transmitter/receiver can be configured to send a position of the vehicle to a remote site or can send vehicle information, e.g., location, speed, etc. to a remote site. In some examples, the navigation system can be configured to adjust vehicle settings using entries in a lookup table of the mobile device. For example, a speed limiter setting or other desired user-specified parameters may be selected or implemented by the navigation system. For ease of use, the navigation system can be configured to receive oral commands from an operator of the vehicle. If desired, the navigation system can log vehicle information.

In certain embodiments, the navigation system can include processing means, position detecting means electrically coupled to the processing means for determining a position of a vehicle, display means electrically coupled to the processing means for displaying route information, and a circuit electrically coupled to the processing means and configured to receive an input from a mobile device, the circuit constructed and arranged to prevent operation of the vehicle when the mobile device is not coupled to the circuit and to allow operation of the vehicle when the mobile device is coupled to circuit.

In some examples, the circuit can be electrically coupled to coupling means for coupling to the mobile device. In other examples, the coupling means is positioned out of reach of a vehicle operator or inaccessible to the vehicle operator. In additional examples, the coupling means can be electrically coupled to a wireless unit to permit wireless coupling of the mobile device to the coupler. In further examples, the system can include wireless phone means for permitting hands free calling from the mobile device when the mobile device is coupled to the navigation system. In other examples, the circuit can be configured to compare an identifier of the mobile device to an entry in a lookup table to permit operation of the vehicle if the identifier matches the entry in the lookup table. In some examples, system can be configured to display a reminder on the display means to retrieve the mobile device when the vehicle is switched off. In other examples, the system can include a second coupler electrically coupled to the processor and configured to couple to a second mobile device. In additional examples, the circuit can be configured to permit operation of the vehicle only when the mobile device and the second mobile device are both coupled to the system. In further examples, the circuit can be configured to permit operation of the vehicle once the mobile device is coupled without the use of a separate key.

In other examples, the system can include override means configured to permit operation of the vehicle when the mobile device is not coupled to the circuit. For example, the override means can be configured to permit operation of the vehicle at speeds less than 10 miles per hour, can be configured to only permit shifting of the transmission into neutral and/or, if desired, can be configured to be activated using a remote signal. In some examples, the system can also include transmitter/receiver means electrically coupled to the circuit and configured to receive input from a remote user. In some examples, the transmitter/receiver means can be configured to send a position of the vehicle to a remote site or can send vehicle information to a remote site. In certain examples, the system can be configured to adjust vehicle settings using entries in a lookup table of the mobile device. In some examples, the system can be further configured to receive oral commands from an operator of the vehicle. In additional examples, the system can be further configured to log vehicle information.

Figure 10:
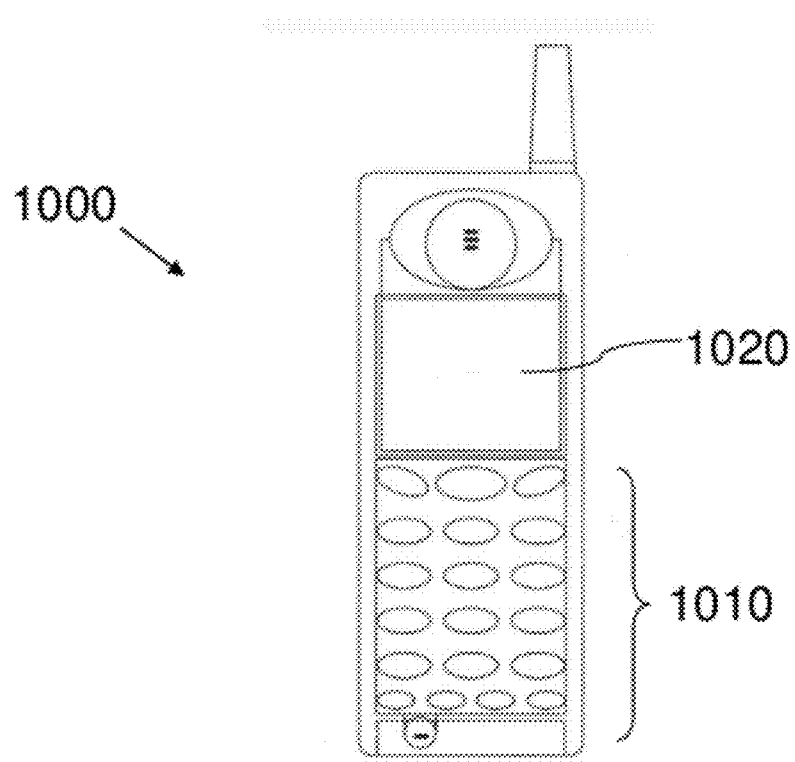
FIG. 10 is an illustration of a mobile device, in accordance with certain examples.

In certain embodiments, a mobile device is provided that can be used to implement the methods described herein. For example, a mobile device configured to be coupled to a vehicle to permit starting of the vehicle when the mobile device is electrically coupled at least one electrical system of the vehicle can be used. Referring to FIG. 10, a mobile device 1000 is shown which includes a keyboard 1010, an interface screen 1020 and an internal processor. The mobile device 1000 shown in FIG. 10 is merely illustrative and other mobile devices including those having virtual keyboards can be substituted or otherwise used with the technology described herein. In some examples, the mobile device can be configured to disable text messaging or non hands free functions when the device is coupled to the vehicle. In other examples, the mobile device can be configured to be charged when coupled to the vehicle. In additional examples, the mobile device comprises an identifier to permit starting of the vehicle. In some examples, the mobile device can be configured to disable its interface screen 1020 or its keyboard 1010 when coupled to the vehicle. In other examples, the mobile device can be configured to couple to a wireless unit to permit hands free calling when the mobile device is coupled to the vehicle. In some examples, the mobile device can be configured to couple wirelessly to the vehicle. In additional examples, the mobile device can be configured to couple to the vehicle in addition to a prior coupled mobile device. In certain embodiments, the mobile device can include user-specified parameters to adjust the vehicle settings. In further embodiments, the mobile device can be a cellular phone, a smart phone, a personal digital assistant or an enterprise digital assistant. In some examples, the mobile device can be rendered dumb when coupled to the vehicle. In some embodiments, the mobile device can be configured with a "Start" button, which may be a physical button on the keyboard 1010 of the mobile device 1000 or may appear on the interface screen 1020. Such start button may permit starting of the vehicle by activation of the button, typically after the mobile device has been wirelessly coupled to the vehicle.

In certain embodiments, a mobile device capable of text messaging can be used to control operation of a vehicle. For example, the mobile device can be configured to be coupled to a vehicle to permit switching of the vehicle into drive when the mobile device is electrically coupled at least one electrical system of the vehicle. In some examples, the mobile device can be further configured to disable text messaging when the device is coupled to the vehicle. In certain examples, the mobile device is configured to be charged when coupled to the vehicle. In some examples, the mobile device comprises an identifier to permit switching of the vehicle into drive. In certain embodiments, the mobile device can be configured to disable an interface screen when coupled to the vehicle. In other embodiments, the mobile device can be configured to couple to a wireless unit to permit hands free calling when the mobile device is coupled to the vehicle. In additional embodiments, the mobile device can be configured to couple wirelessly to the vehicle. In some embodiments, the mobile device can be configured to couple to the vehicle in addition to a prior coupled mobile device. In certain examples, the mobile device comprises user-specified parameters to adjust the vehicle settings. In additional examples, the mobile device can be a cellular phone, a smart phone, a personal digital assistant or an enterprise digital assistant. In further examples, the mobile device can be rendered dumb when coupled to the vehicle.

In certain embodiments, a method of preventing a vehicle operator from sending text messages while operating the vehicle is provided. In certain examples, the method comprises coupling a mobile device to the vehicle to permit operation of the vehicle, and disabling text messaging of the mobile device to prevent sending of text messages while the mobile device is coupled to the vehicle. In some examples, the method can include disabling the text messaging by rendering the mobile device dumb. In other examples, the method can include disabling the text messaging by deactivating an interface screen of the mobile device. In additional examples, the method can include coupling a second mobile device to the vehicle to permit operation of the vehicle. In further examples, the method can include coupling the mobile device to the vehicle through a coupler electrically coupled to an electrical system of the vehicle. In some embodiments, the method can include coupling the mobile device to the vehicle to permit starting of the vehicle. In additional embodiments, the method can include coupling the mobile device to the vehicle to permit shifting of the vehicle into drive.

In some embodiments, the method can include configuring the mobile device for hands free calling when the mobile device is coupled to the vehicle. In further embodiments, the method can include configuring the mobile device to receive a unique identifier to permit operation of the vehicle. In additional embodiments, the method can include configuring the mobile device to receive user specific information.

In certain examples, another method of preventing a vehicle operator from sending text messages while operating the vehicle is described. In some examples, the method comprises coupling a mobile device to the vehicle to permit operation of the vehicle, in which the mobile device is coupled to the vehicle at a position inaccessible to an operator of the vehicle. In certain embodiments, the method can include disabling the text messaging by rendering the mobile device dumb. In additional embodiments, the method can include disabling the text messaging by deactivating an interface screen of the mobile device. In other embodiments, the method can include coupling a second mobile device to the vehicle to permit operation of the vehicle. In some embodiments, the method can include coupling the mobile device to the vehicle through a coupler electrically coupled to an electrical system of the vehicle. In additional embodiments, the method can include coupling the mobile device to the vehicle to permit starting of the vehicle. In yet other embodiments, the method can include coupling the mobile device to the vehicle to permit shifting of the vehicle into drive. In other embodiments, the method can include configuring the mobile device for hands free calling when the mobile device is coupled to the vehicle. In some embodiments, the method can include configuring the mobile device to receive a unique identifier to permit operation of the vehicle. In other embodiments, the method can include configuring the mobile device to receive user specific information.

In certain embodiments, a method of permitting hands free phone calls from a mobile device while operating a vehicle and preventing text messaging from the mobile device while operating the vehicle is disclosed. In certain examples, the method comprises coupling the mobile device to vehicle to permit operation of the vehicle and disabling the text messaging of the mobile device when coupled to the vehicle.

In some examples, the method can include disabling the text messaging by deactivating the text messaging capability of the mobile device. In other examples, the method can include disabling the text messaging by deactivating an interface screen of the mobile device. In further examples, the method can include coupling a second mobile device to the vehicle to permit operation of the vehicle. In some examples, the method can include coupling the mobile device to the vehicle through a coupler electrically coupled to an electrical system of the vehicle. In other examples, the method can include coupling the mobile device to the vehicle to permit starting of the vehicle. In additional examples, the method can include coupling the mobile device to the vehicle to permit shifting of the vehicle into drive. In further examples, the method can include configuring the mobile device for hands free calling through a Bluetooth® unit of the vehicle when the mobile device is coupled to the vehicle. In some examples, the method can include configuring the mobile device to receive a unique identifier to permit operation of the vehicle. In additional examples, the method can include configuring the mobile device to receive user specific information.

In certain examples, a method of permitting hands free phone calls from a mobile device while operating a vehicle and preventing text messaging from the mobile device while operating the vehicle that includes coupling the mobile device to vehicle at a position inaccessible to an operator of the vehicle to permit operation of the vehicle is provided.

In some embodiments, the method comprises disabling the text messaging by deactivating the text messaging capability of the mobile device. In other embodiments, the method comprises disabling the text messaging by deactivating an interface screen of the mobile device. In additional embodiments, the method comprises coupling a second mobile device to the vehicle to permit operation of the vehicle. In further embodiments, the method comprises coupling the mobile device to the vehicle through a coupler electrically coupled to an electrical system of the vehicle. In some embodiments, the method comprises coupling the mobile device to the vehicle to permit starting of the vehicle. In additional embodiments, the method comprises coupling the mobile device to the vehicle to permit shifting of the vehicle into drive. In other embodiments, the method comprises configuring the mobile device for hands free calling through a Bluetooth® unit of the vehicle when the mobile device is coupled to the vehicle. In yet other embodiments, the method comprises configuring the mobile device to receive a unique identifier to permit operation of the vehicle. In further embodiments, the method comprises configuring the mobile device to receive user specific information.

In certain examples, a kit for preventing text messaging while driving is provided. In some embodiments, the kit comprises a memory unit or device comprising a method to prevent operation of the vehicle when a mobile device is not coupled to the vehicle and to allow operation of the vehicle when the mobile device is coupled to vehicle. In other examples, the kit may include instructions for flashing the engine control unit of a vehicle with the method on the memory device.

In certain embodiments, the kit can include a coupler configured to couple the mobile device to the engine control unit of the vehicle. In further embodiments, the kit can include a second coupler different from the coupler, the second coupler configured to couple a second mobile device to the engine control unit of the vehicle. In some examples, each coupler can be individually controlled by an administrator. In additional embodiments, the kit can include a device configured to receive the memory unit and to couple to a port of the vehicle to flash the engine control unit. In some embodiments, the device is configured to couple to an OBDII port of the vehicle.

In certain embodiments, a kit for preventing text messaging while driving that comprises memory means for flashing an engine control means with a method to prevent operation of the vehicle when a mobile device is not coupled to the vehicle and to allow operation of the vehicle when the mobile device is coupled to vehicle, and instructions for using the memory means is described. In certain examples, the kit can include coupling means configured to couple the mobile device to the engine control means of the vehicle. In other examples, the kit can include second coupling means different from the coupling means, the second coupling means for coupling a second mobile device to the engine control means of the vehicle. In additional examples, the kit can include device means for receiving the memory means and for coupling with a port of the vehicle to flash the engine control means. In further examples, the device means can be configured to couple to an OBDII port of the vehicle.

In certain examples, a method comprising determining if a vehicle is constructed and arranged to receive an input from a mobile device, the vehicle configured to prevent operation of the vehicle when the mobile device is not coupled to the vehicle and to allow operation of the vehicle when the mobile device is coupled to vehicle, and providing an insurance policy cost estimate based on the determined vehicle is described. In some examples, the method may include configuring the vehicle to prevent operation of the vehicle when the mobile device is not coupled to the vehicle and to allow operation of the vehicle when the mobile device is coupled to vehicle, and adjusting the insurance cost estimate.

In other examples, a method comprising determining if a vehicle is constructed and arranged to receive an input from a mobile device, the vehicle configured to prevent operation of the vehicle when the mobile device is not coupled to the vehicle and to allow operation of the vehicle when the mobile device is coupled to vehicle, and providing an insurance policy based on the determined vehicle is provided. In some examples, the method may include configuring the vehicle to prevent operation of the vehicle when the mobile device is not coupled to the vehicle and to allow operation of the vehicle when the mobile device is coupled to vehicle, and adjusting the cost of the insurance policy.

In some examples, a method of facilitating safe driving comprising configuring a vehicle to be inoperable when a mobile device is not coupled to the vehicle and is configured to be operable when the mobile device is coupled to vehicle is disclosed.

In additional examples, a method of facilitating safe driving, the method comprising configuring a vehicle to be inoperable when a mobile device is not coupled to the vehicle and is configured to be operable when the mobile device is coupled to vehicle in a location inaccessible by a vehicle operator is provided.

In some examples, a method of facilitating safe driving, the method comprising providing a vehicle that is configured to be inoperable when a mobile device is not coupled to the vehicle and configured to be operable when the mobile device is coupled to vehicle in a location inaccessible by a vehicle operator is provided.

In certain embodiments, a method of facilitating safe operation of a public transit vehicle, the method comprising providing a drive vehicle of a public transit vehicle that is configured to be inoperable when a mobile device is not coupled to the drive vehicle and configured to be operable when the mobile device is coupled to drive vehicle of the public transit vehicle is described. As used herein, drive vehicle refers to the vehicle that provides power. In instances where more than one drive vehicle is present, at least one drive vehicle may be configured to implement the methods described herein.

In additional embodiments, a method of facilitating safe operation of a public transit vehicle, the method comprising providing a drive vehicle of a public transit vehicle that is configured to be inoperable when a mobile device is not coupled to the drive vehicle and configured to be operable when the mobile device is coupled to drive vehicle of the public transit vehicle in a location inaccessible by a drive vehicle operator is disclosed.

In further embodiments, a method of facilitating safe operation of a train, the method comprising providing a locomotive that is configured to be inoperable when a mobile device is not coupled to the locomotive and configured to be operable when the mobile device is coupled to locomotive in a location inaccessible by a drive vehicle operator is operative.

In other embodiments, a method of facilitating safe operation of a train comprising providing a locomotive that is configured to be inoperable when a mobile device is not coupled to the locomotive and configured to be operable when the mobile device is coupled to locomotive is disclosed.

In additional embodiments, a method of facilitating safe operation of a train, the method comprising providing a locomotive that is configured to be inoperable when a mobile device is not coupled to the locomotive and configured to be operable when the mobile device is coupled to locomotive in a location inaccessible by a drive vehicle operator is provided.

In some examples, a passenger vehicle configured to be inoperable when a mobile device is not coupled to the vehicle and configured to be operable when the mobile device is coupled to vehicle is described.

In other examples, a passenger vehicle configured to be inoperable when a mobile device is not coupled to the vehicle and configured to be operable when the mobile device is coupled to vehicle in a location inaccessible by a vehicle operator is provided.

In further examples, a commercial vehicle configured to be inoperable when a mobile device is not coupled to the vehicle and configured to be operable when the mobile device is coupled to vehicle is described.

In additional examples, a commercial vehicle configured to be inoperable when a mobile device is not coupled to the vehicle and configured to be operable when the mobile device is coupled to vehicle in a location inaccessible by a vehicle operator is provided.

In some examples, a commercial vehicle configured to be inoperable when first and second mobile devices are not coupled to the vehicle and configured to be operable when the first and second mobile devices are coupled to vehicle is disclosed.

In other examples, a commercial vehicle configured to be inoperable when first and second mobile devices are not coupled to the vehicle and configured to be operable when the first and second mobile devices are coupled to vehicle in a location inaccessible by a vehicle operator is provided.

In further examples, a public transit vehicle configured to be inoperable when a mobile device is not coupled to the vehicle and configured to be operable when the mobile device is coupled to vehicle is described.

In additional examples, a public transit vehicle configured to be inoperable when first and second mobile devices are not coupled to the vehicle and configured to be operable when the first and second mobile devices are coupled to vehicle is provided.

In certain embodiments, a vehicle configured for flight and configured to be inoperable when a mobile device is not coupled to the vehicle and configured to be operable when the mobile device is coupled to vehicle is described.

In certain examples, a user may attempt to circumvent the systems and methods described herein by using extension cords, software programs or other bypass features to permit operation of the vehicle while at the same time preserving the ability to send text messages. To mitigate against such an occurrence, the coupler can be configured as a locking compartment (or include a locking door) that remains locked while the vehicle is started or is in gear. As discussed herein, the display or interface of the mobile device may also be disabled to prevent text messaging while the mobile device is coupled. Other possible configurations to reduce the likelihood that text messaging and vehicle operation can be simultaneously performed will be recognized by the person of ordinary skill in the art, given the benefit of this disclosure. For example, the technology described herein can be used in combination with that described in US 20100087137, the entire disclosure of which is incorporated herein by reference.

In certain embodiments, the systems and methods described herein can include one or more safety features such that the vehicle engine does not switch off if the mobile device is removed while the vehicle is in operation. For example, once the vehicle reaches a certain speed, e.g., above 5 mph, the system may permit operation of the vehicle for a limited time after the mobile device is decoupled to avoid crashing or unwanted braking of the vehicle. In some examples, once the vehicle comes to a complete stop, the system may reimplement one or more methods requiring a user to couple the mobile device before the vehicle can be operated again. Other methods of reimplementing the methods described herein will be readily selected by the person of ordinary skill in the art, given the benefit of this disclosure.

In certain examples, the systems, method and devices described herein can be used with one or more biometric features to authorize a user to operative a vehicle. For example, a user's fingerprint stored in the mobile device can be matched with a fingerprint of a finger pressed against a screen in the vehicle to verify the operator is an authorized user of the vehicle. The fingerprint may also be stored in a lookup table in the system. Other biometric features and user features, e.g., user weight, etc., can be used to authorize use of the vehicle.

In certain embodiments, the devices, systems and methods described herein may include, or be used with, at least one processor optionally electrically coupled to one or more memory units. In certain examples, the module may be a larger part of a computer system, e.g., part of the ECU of the vehicle, whereas in other examples, the module may be a stand alone module and include its own processor. The computer system may be, for example, a general-purpose computer such as those based on Unix, Intel PENTIUM-type processor, Motorola PowerPC, Sun UltraSPARC, Hewlett-Packard PA-RISC processors, or any other type of processor. In some examples, the processor may be an inexpensive processor that may be programmable to receive inputs from an administrator to configure the system as desired. It should be appreciated that one or more of any type computer system may be used according to various embodiments of the technology. Further, the system may be located on a single computer or may be distributed among a plurality of computers attached by a communications network. A general-purpose computer system may be configured, for example, to perform any of the described functions including but not limited to: vehicle override, override time out, speed limiter, and the like. It should be appreciated that the system may perform other functions, including network communication, and the technology is not limited to having any particular function or set of functions. It is desirable that the system permit remote access to allow an administrator to configure the system on the fly.

For example, various aspects may be implemented as specialized software executing in a general-purpose computer system. The computer system may include a processor connected to one or more memory units, such as a disk drive, memory, or other device for storing data. The memory unit is typically used for storing programs and data during operation of the device. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between system components of the system. The interconnection device typically is electrically coupled to the processor such that electrical signals may be provided to control operation of the vehicle.

The computer system may also include one or more input devices, for example, a keyboard, mouse, trackball, microphone, touch screen, touch pad, manual switch (e.g., override switch) and one or more output devices, for example, a printing device, display screen, speaker, etc. In addition, the computer system may contain one or more interfaces (not shown) that connect computer system 800 to a communication network in addition or as an alternative to the interconnection device.

The storage system typically includes a computer readable and writeable nonvolatile recording medium in which signals are stored that define a program to be executed by the processor or information stored on or in the medium to be processed by the program. For example, the SIM card identifiers, user-specified parameters, time out periods, override parameters and the like used in certain embodiments disclosed herein may be stored on the medium. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in memory system, for example. The processor generally manipulates the data within the integrated circuit memory and then copies the data to the medium after processing is completed. A variety of mechanisms are known for managing data movement between the medium and the integrated circuit memory element, and the technology is not limited thereto. The technology is also not limited to a particular memory system or storage system.

In certain examples, the computer system may also include specially-programmed, special-purpose hardware, for example, an application-specific integrated circuit (ASIC). Aspects of the technology may be implemented in software, hardware or firmware, or any combination thereof. Further, such methods, acts, systems, system elements and components thereof may be implemented as part of the computer system described above or as an independent component that can be added to the vehicle, e.g., either through software upload or by using a separate module that is added to the vehicle's electrical system.

Although a computer system is described by way of example as one type of computer system upon which various aspects of the technology may be practiced, it should be appreciated that aspects are not limited to being implemented on any particular type of computer system. Various aspects may be practiced on one or more computers having a different architecture or components than that described herein. The computer system may be a general-purpose computer system that is programmable using a high-level computer programming language. The computer system may be also implemented using specially programmed, special purpose hardware. In the computer system, the processor is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP or Windows Vista operating systems available from the Microsoft Corporation, MAC OS System X operating system available from Apple Computer, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a computer platform for which application programs in high-level programming languages may be written. For example, the technology described herein may be tunable or controllable by an administrator where the administrator can add vehicle specific functions based on their needs or desires. It should be understood that the technology is not limited to a particular computer system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate computer systems could also be used.

In certain examples, the hardware or software can be configured to implement cognitive architecture, neural networks or other suitable implementations. For example, a remote operator database may be linked to the system to permit operation of the vehicle by those users specified in the operator database. Such configuration provides for operation of the vehicle by many different users as specified off-site. One or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. In some examples, the module in the vehicle may function as a client computer and a remote server may be present at an administrator site and can be configured to send commands to the client computer. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP), Bluetooth, etc. It should also be appreciated that the technology is not limited to executing on any particular system or group of systems. Also, it should be appreciated that the technology is not limited to any particular distributed architecture, network, or communication protocol.

In some examples, various embodiments may be programmed using an object-oriented programming language, such as SmallTalk, Basic, Java, C++, Ada, or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A system for a vehicle comprising:
a processor;
a circuit electrically coupled to the processor and configured to receive an input from a mobile device, the circuit constructed and arranged to prevent operation of the vehicle when the mobile device is not coupled to the circuit and to allow operation of the vehicle when the mobile device is coupled to circuit; and
a wired coupler electrically coupled to the circuit and configured to physically contact the mobile device through a coupler of the mobile device to electrically couple the mobile device and the circuit.

2. The system of claim 1, in which the circuit is configured to prevent starting of the vehicle when the coupler of mobile device is not coupled to the wired coupler and to allow starting of the vehicle when the coupler of mobile device is coupled to the wired coupler.

3. The system of claim 1, in which the circuit is configured to prevent shifting of the vehicle into drive when the coupler of the mobile device is not coupled to the wired coupler and to allow shifting of the vehicle into drive when the coupler of mobile device is coupled to the wired coupler.

4. The system of claim 1, in which the wired coupler is positioned in a cradle, socket, or docking station.

5. The system of claim 1, in which the wired coupler provides the electrical coupling between the mobile device and circuit, and the circuit is configured to render manual input of the mobile device unusable by a vehicle operator when the mobile device is electrically coupled to the circuit through the wired coupler.

6. The system of claim 1, in which the wired coupler is further configured to charge the mobile device.

7. The system of claim 1, further comprising an override system configured to permit operation of the vehicle for a configurable period or a pre-determined period after the coupler of mobile device is decoupled from the wired coupler.

8. The system of claim 7, in which the override system is configured to permit operation of the vehicle at speeds less than a top speed selected by an administrator.

9. The system of claim 7, in which the override system is configured to only permit shifting of the transmission into neutral.

10. The system of claim 7, in which the override system is configured to be activated using a remote signal.

11. The system of claim 1, in which all non hands free functions of the mobile device are disabled when the mobile device is coupled to the circuit.

12. The system of claim 1, in which the system is configured to implement at least one user-specified parameter based on an identifier on the mobile device.

13. The system of claim 1, in which the circuit is configured to permit operation of the vehicle once the mobile device is coupled to the wired coupler without the use of a separate key.

14. The system of claim 1, further comprising a memory unit electrically coupled to the processor and configured to receive a method that prevents operation of the vehicle when the coupler of the mobile device is not coupled to the wired coupler and to allow operation of the vehicle when the coupler of the mobile device is coupled to the wired coupler.

15. The system of claim 1, further comprising a second wired coupler electrically coupled to the processor and the circuit and configured to couple to a coupler of a second mobile device by physical contact.

16. The system of claim 15, in which the circuit is configured to permit operation of the vehicle only when the coupler of the mobile device physically contacts the wired coupler and when the coupler of the second mobile device physically contacts the second wired coupler.

17. The system of claim 1, further comprising a sensor coupled to the processor, the sensor configured to provide feedback to a vehicle operator to retrieve the mobile device when an engine of the vehicle is switched off.

18. The system of claim 1, further comprising a GPS device electrically coupled to the processor.

19. The system of claim 1, further comprising a docking station comprising the wired coupler and configured to receive the mobile device to prohibit a user from manually entering commands in the mobile device when the mobile device is received by the docking station and coupled to the wired coupler, in which the docking station is configured to permit the mobile device to remain accessible to the vehicle operator when the mobile device is coupled to the wired coupler of the docking station during operation of the vehicle.

20. The system of claim 19, in which the docking station is configured to obscure only part of the user interface of the mobile device.

* * * * *